United States Patent
Celozzi et al.

(10) Patent No.: US 11,765,054 B2
(45) Date of Patent: Sep. 19, 2023

(54) FIRST ENTITY, SECOND ENTITY, THIRD ENTITY, AND METHODS PERFORMED THEREBY FOR PROVIDING A SERVICE IN A COMMUNICATIONS NETWORK

(71) Applicant: Telefonaktiebolaget LM Ericsson (publ), Stockholm (SE)

(72) Inventors: Giuseppe Celozzi, Naples (IT); Luca Baldini, Rome (IT); Daniele Gaito, Naples (IT); Gaetano Patria, San Prisco (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/609,855

(22) PCT Filed: May 24, 2019

(86) PCT No.: PCT/EP2019/063492
§ 371 (c)(1),
(2) Date: Nov. 9, 2021

(87) PCT Pub. No.: WO2020/239188
PCT Pub. Date: Dec. 3, 2020

(65) Prior Publication Data
US 2022/0239568 A1 Jul. 28, 2022

(51) Int. Cl.
*H04L 41/5051* (2022.01)
*H04L 41/5025* (2022.01)
*H04L 41/40* (2022.01)

(52) U.S. Cl.
CPC .......... *H04L 41/5051* (2013.01); *H04L 41/40* (2022.05); *H04L 41/5025* (2013.01)

(58) Field of Classification Search
None
See application file for complete search history.

(56) References Cited

U.S. PATENT DOCUMENTS

2010/0138688 A1* 6/2010 Sykes .................... H04L 65/80
709/224
2016/0072724 A1* 3/2016 Amann .................. H04L 67/10
709/226

(Continued)

FOREIGN PATENT DOCUMENTS

CN 108809671 A 11/2018
CN 108965024 B 8/2021

(Continued)

OTHER PUBLICATIONS

Translation of WO2018219148, Dec. 6, 2018, pp. 1-21 (Year: 2018).*

(Continued)

*Primary Examiner* — Joshua Joo
(74) *Attorney, Agent, or Firm* — Murphy, Bilak & Homiller, PLLC

(57) ABSTRACT

A method, performed by a first entity (111), for providing a service in a communications network (100). The first entity (111) obtains (701), from a second entity (112), a request. The request is for one or more links (118) to be allocated to a first network slice to provide a service via one or more paths (117). The (118) connect one or more nodes (115). The request indicates at least one of: a) one or more requirements to be met by the links (118), and b) a first priority to be assigned to the first network slice. The first entity (111) determines (702) the links (118) to be allocated to the first network slice. The determining (701) is based on the one or more requirements, the first priority, and a set of available resources. The first entity (111) sends (705), to another entity (112, 113), an indication based on the determined links (118).

22 Claims, 11 Drawing Sheets

(56) References Cited

U.S. PATENT DOCUMENTS

| | | | |
|---|---|---|---|
| 2017/0085493 A1* | 3/2017 | Senarath | H04L 47/522 |
| 2017/0141973 A1 | 5/2017 | Vrzic | |
| 2018/0123973 A1* | 5/2018 | Nasser | G06F 9/505 |
| 2018/0124854 A1 | 5/2018 | Myhre et al. | |
| 2018/0239648 A1* | 8/2018 | Formanek | G06F 9/5072 |
| 2018/0287894 A1* | 10/2018 | Senarath | H04L 41/40 |
| 2019/0281494 A1* | 9/2019 | Chan | H04W 72/56 |
| 2020/0059407 A1 | 2/2020 | Lu et al. | |
| 2020/0128445 A1* | 4/2020 | Dong | H04W 16/04 |
| 2020/0328944 A1* | 10/2020 | Zhang | H04W 84/18 |
| 2021/0409343 A1* | 12/2021 | Suehiro | H04W 48/18 |

FOREIGN PATENT DOCUMENTS

| | | | | |
|---|---|---|---|---|
| WO | WO-2017028907 A1 * | 2/2017 | ......... | G06F 9/45558 |
| WO | 2018188767 A1 | 10/2018 | | |
| WO | 2018219148 A1 | 12/2018 | | |
| WO | 2018219479 A1 | 12/2018 | | |

OTHER PUBLICATIONS

"3GPP TS 22.261 V16.0.0", 3rd Generation Partnership Project; Technical Specification Group Services and System Aspects; Service requirements for the 5G system; Stage 1 (Release 16), Jun. 2017, pp. 1-49.

"3GPP TS 28.541 V15.1.0", 3rd Generation Partnership Project; Technical Specification Group Services and System Aspects; Management and orchestration; 5G Network Resource Model (NRM); Stage 2 and stage 3 (Release 15), Dec. 2018, pp. 1-232.

"5G Americas White Paper—Network Slicing for 5G and Beyond", http://www.5gamericas.org/files/3214/7975/0104/5G_Americas_Network_Slicing_11.21_Final.pdf, Nov. 21, 2016, pp. 1-35.

"ETSI GR NFV-EVE 012 V3.1.1", Network Functions Virtualisation (NFV) Release 3; Evolution and Ecosystem; Report on Network Slicing Support with ETSI NFV Architecture Framework, Dec. 2017, pp. 1-35.

"ETSI GS NFV-IFA 014 V2.1 1", Network Functions Virtualisation (NFV); Management and Orchestration; Network Service Templates Specification, Oct. 2016, pp. 1-35.

Kavanagh, Sacha, "What is Network Slicing?", https://5g.co.uk/guides/what-is-network-slicing/, Aug. 28, 2018, pp. 1-9.

* cited by examiner a)

b)

a)

b)

a)

b)

a)

b)

FIRST ENTITY, SECOND ENTITY, THIRD ENTITY, AND METHODS PERFORMED THEREBY FOR PROVIDING A SERVICE IN A COMMUNICATIONS NETWORK

TECHNICAL FIELD

The present disclosure relates generally to a first entity and methods performed thereby for providing a service in a communications network. The present disclosure also relates generally to a second entity, and methods performed thereby for providing a service in a communications network. The present disclosure further relates generally to a third entity and methods performed thereby for providing a service in a communications network. The present disclosure further relates generally to computer programs and computer-readable storage mediums, having stored thereon the computer programs to carry out these methods.

BACKGROUND

Communication devices within a telecommunications network may be user equipments (UEs), e.g., stations (STAs), wireless devices, mobile terminals, wireless terminals, terminals, and/or Mobile Stations (MS). User equipments are enabled to communicate wirelessly in a cellular communications network or wireless communication network, sometimes also referred to as a cellular radio system, cellular system, or cellular network. The communication may be performed e.g., between two user equipments, between a user equipment and a regular telephone, and/or between a user equipment and a server via a Radio Access Network (RAN), and possibly one or more core networks, comprised within the telecommunications network. User equipments may further be referred to as mobile telephones, cellular telephones, laptops, or tablets with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another terminal or a server.

The telecommunications network may cover a geographical area which may be divided into cell areas, each cell area being served by a network node, e.g., a radio network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as user equipments, with serving beams.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or Fifth generation of cellular mobile communications (5G)-UTRA, as well as a 5G Packet Core Network, which may be referred to as Next Generation (NG) Core Network, abbreviated as NG-CN, NGC or 5G CN.

Network slicing has emerged as a major new networking paradigm for meeting the diverse requirements of various vertical businesses in virtualized and softwarized 5G networks.

A network slice may be understood as a dynamically-created logical end-to-end network with an optimized topology to serve a specific use case, a service class or a customer. A network slice may be understood to comprise all network resources that may be required, configured together. A network slice may be created, changed and removed by management functions.

Typical use cases of different classes of Quality of Service (QoS) requirements may comprise enhanced Mobile Broadband (eMBB), Ultra-Reliable and Low-Latency Communications (uRLLC), and massive Machine Type Communications (mMTC), as defined by the International Telecommunication Union (ITU).

A mobile network operator may be able to slice network resources, such as routers and links, along with compute and storage resources, for running Network Functions Virtualizations (NFVs) and cloud apps, and allocate them to a service. Though the technology is being spearheaded by the cellular telecommunications-focused 3rd Generation Partnership Project (3GPP), network slicing is likely to find application in fixed networks as well.

Two appealing features of network slicing may be orchestration and isolated performance guarantees. An orchestrator may be to slice a network, along with compute and storage resources, and run a service in that slice. Isolated performance guarantees may be understood to that ensure one slice may not be able to interfere with the performance of another slice. One slice of the network may provide mission-critical services, such as those that may be used during an emergency response, another slice may serve traditional cellular users, a third slice may be allocated for Internet of Things (IoT) devices, and perhaps a fourth slice may be for an Mobile Virtual Network Operator (MVNO) customer, and so on.

An example architectural framework is under development within the European Telecommunications Standards Institute (ETSI), known as a Network Functions Virtualization (NFV). Network slicing may be understood as a form of virtual network architecture using Software Defined Network (SDN) and NFV technologies for leveraging network functions and services in the slices.

FIG. 1 schematically illustrates a non-limiting example of a network functions virtualization management and orchestration (NFV-MANO) 10 architecture, with the NFV management entities. In gross, the management and orchestration architecture may comprise an NFV orchestrator (NFVO) 11 and a Virtual Infrastructure Manager (VIM) 12, each having a reference point to a Virtual Network Function (VNF) manager 13. An Operations Support System/Business Support System (OSS/BSS) 14 may have a reference point to the NFVO 11, and another reference point to an Element Management System (EMS) 15, which in turn may have one reference point to the VNF manager 13 and another to the VNF 16. The VNF 16 has a reference point to the VNF manager 13 and another to the NFV infrastructure. The NFV infrastructure (NFVI) 17 has a reference point to the VIM 12, which has another reference point to the NFVO 11. The NFVO 11 may manage the functionality of a Network Slice catalogue 18, a VNF catalogue 19, NFV instances 20 and Network Functions Virtualization Infrastructure (NFVI) 21. Also depicted in FIG. 1 are the different interfaces connecting these entities.

FIG. 2 schematically illustrates a non-limiting example of an SDN architecture, in which core functions of the network may be centered in the SDN controller layer. Service providers and communication service providers may gain network control independence from network equipment vendors by simplifying the network design, implementation and operation. The network operator may set the network node through the use of a simple programming method, rather than manually setting each of the numerous distributed units. As depicted in FIG. 2, Business applications 20 in an application layer 21 may communicate behaviors and needed resources with network services 22 in a control layer 23 via application programming interfaces (APIs). The control layer 23 may then relay the instructions or requirements from the application layer 21 to the infrastructure layer 24, which may control the forwarding and data processing capabilities for the network, such as forwarding and processing of the data path. Centralized functions of the SDN controller may be used to promptly handle network issues and greatly reduce the time that may be needed to provide a new network service or application.

SDN and NFV are now being commercially deployed to deliver greater network flexibility by allowing traditional network architectures to be partitioned into virtual elements that may be linked, also through software.

Network slicing may be understood to allow multiple virtual networks to be created on top of a common shared physical infrastructure.

One of the key requirements of the 5G networks may be understood to be to support a variety of vertical industries such as smart grid, e-health and smart city. These verticals may derive different use cases which may impose much stricter requirements than today services do. It is well understood that these requirements may be satisfied after significant improvements in the architecture may be implemented. Network slicing may meet the diverse requirement for verticals and thus may be understood to be a key concept in the coming 5G Network.

An End-to-End (E2E) service may comprise different domains, each one having different technologies. The E2E slice may consist of sub-slices that may belong to one or more domains. The slice may be understood as an instance that may implement and run the services requested by the verticals independently of each other, with a distinct set of resources. Therefore, slicing may be understood to be an enabler to support the verticals on a single infrastructure, while maintaining and satisfying the Quality of Service (QoS) guarantees and Service Level Agreement (SLA) agreements with the verticals.

FIG. 3 schematically illustrates a non-limiting example of the recursion levels a slice or instance may have in line with the recursive nature of a Network Slice Instance (NSI) and Network Slice Subnet Instance (NSSI) defined in Next Generation Mobile Networks (NGMN) and 3GPP. As it is seen in the FIG. 3, each slice may be identified by a single identifier for a specific administrative domain, and for each infrastructure segment, for example Radio Access Network (RAN), Mobile Edge Computing (MEC), etc. At the top level, for an E2E slice 31 across multiple domains, the slice may comprise the ordered, structured and connected slices from individual involved single domains, i.e., Slice #1@Domain 1 32, Slice #2@Domain 2 33, Slice #3@Domain 3 34, etc. These single-domain slices may be the Network Slice Instances (NSIs) of the E2E multi-domain NSI, and they may be controlled and managed by the corresponding domains respectively. At the intermediate level, within an individual domain, a, single-domain, slice, a single slice may comprise many slices, called sub-slices, e.g., Slice 190 1@Domain 1 32, comprises the various sub-slices 35, 36, 37, 38 offered by the involved network segments, including Enterprise network, Radio Access Network (RAN), Mobile Edge Computing (MEC) or Edge network and Core network. The corresponding example sub-slices are Sub-slice #1.a@Enterprise segment 35, Sub-slice #1.b@RAN segment 36, Sub-slice #1.c@Edge segment 37, and Sub-slice #1.d@Core segment 38, all in Domain 1. These segment-specific sub-slices may be understood as the NSIs of a single-domain, and they are may be controlled and managed by the control and management functions in this domain. It may be noted that the Enterprise network segment may be typically controlled and managed by the corresponding enterprise/vertical 39 that may own this Enterprise network. At the bottom level, a segment-specific sub-slice, or instance, may comprise the following or a subset of the following:

1. Structured and connected network functions 40 through service function chaining, typically based on a predefined network slice template/blueprint, as being defined in NGMN and 3GPP, the programmed data plane for QoS/SLA 41.

2. The physical and virtual resources 42 to run these network functions, as defined in the NGMN network slice model.

FIG. 4 schematically illustrates the correspondence among 3GPP, left side, and European Telecommunications Standards Institute (ETSI) NFV, right side, network slice concepts. According to this correspondence, a Network Slice Instance (NSI) 43 and a Network Slice Subnet Instance (NSSI) 44 may be mapped in the Network Service Instance (NSI) 45 in ETSI NFV Standard, see ETSI GR NFV-EVE 012 V3.1.1—2017 December. The Network Slice Instance (NSI) 43 is used by a communication service 46. The Network Slice Subnet Instance (NSSI) 44 contains one or more NF 47 whereas the Network Service Instance (NSI) 45 contains other NSI or a set of VNFs and Physical Network Functions (PNFs) 48.

Given the above correspondence slice management may occur according to the framework schematically represented in FIG. 5. FIG. 5 schematically illustrates a non-limiting example of how the 3GPP network slice management in the NFV framework, where the 3GPP slice related management functions 51 are, may be connected, through the and Os-Ma-NFVO interface 52, to the ETSI NFVO 11 through the Os-Ma-Nfvo interface 52. On the left side of the Figure, the entities that may be used in the slice management are depicted, while on the right side the NFVO 11 is depicted, which may include the SDN controller and may interface the VIM 21 to allocate links and VNFs 16 and/or PNFs 56. The bottom of the FIG. 5 depicts the network infrastructure. The communication with the SDN Controller is not represented because it uses an internal interface. The network slice management 51 in the NFV framework comprises a Communication Service Management Function 53, a Network Slice Management Function 54 and a Network Slice Subnet Management Function 55. The NFVO 11 has a reference point to the VFNM 13 and the VIM 12. The VFNM 13 in turn has a reference point to the EMS 15 and to the VNFs 16. The NFVI 17 has a reference point to the VIM 12 and to PNFs 56, which also has a reference point to the EMS 15.

In spite of the advances in design and performance of SDNs, the provision of slices in a network is not always guaranteed. With the existing methods of slice creation, a request for the provision of a slice may be refused, which will lead to an underperformance of the network.

SUMMARY

It is an object of embodiments herein to improve the provision of a service in a communications network.

According to a first aspect of embodiments herein, the object is achieved by a method, performed by a first entity. The method is for providing a service in a communications network. The first entity operates in the communications network. The first entity obtains, from a second entity operating in the communications network, a request. The request is for one or more links to be allocated to a first network slice to provide a service in the communications network via one or more paths. The one or more links connect one or more nodes in the communications network. The request indicates at least one of: a) one or more requirements to be met by the one or more links, and b) a first priority to be assigned to the first network slice. The first entity also determines the one or more links to be allocated to the first network slice. The determining is based on the one or more requirements, the first priority, and a set of available resources in the communications network. The first entity additionally sends, to another entity operating in the communications network, an indication based on the determined one or more links.

According to a second aspect of embodiments herein, the object is achieved by a method, performed by the second entity. The method is for providing the service in the communications network. The second entity operates in the communications network. The second entity provides, to the first entity operating in the communications network, the request for the one or more links to be allocated to a first network slice to provide the service in the communications network. The one or more links connect the one or more nodes in the communications network via the one or more paths. The request indicates at least one of: a) the one or more requirements to be met by the one or more links, and b) the first priority to be assigned to the first network slice. The second entity receives, from the first entity a response to the provided request.

According to a third aspect of embodiments herein, the object is achieved by a method, performed by a third entity. The third entity operates in the communications network. The third entity receives, from the first entity operates in the communications network, the indication. The indication indicates a warning about a status of one or more second network slices. The warning indicating one of: a) a reduction from a full requirement satisfaction of the one or more second network slices, and b) a de-allocation of at least one of the one or more second network slices. The one or more second network slices have been assigned one or more second allocations of resources. The receiving is based on a respective second priority assigned to the one or more second allocations. The third entity also initiates performing an operation and maintenance action in the communications network to cease the indicated warning, based on the received indication.

According to a fourth aspect of embodiments herein, the object is achieved by the first entity, for providing the service in the communications network. The first entity is configured to operate in the communications network. The first entity is further configured to, from the second entity configured to operate in the communications network, the request. The request is for the one or more links to be allocated to the first network slice to provide the service in the communications network via the one or more paths. The one or more links are configured to connect the one or more nodes in the communications network. The request is configured to indicate at least one of: a) the one or more requirements to be met by the one or more links, and b) the first priority to be assigned to the first network slice. The first entity is also configured to determine the one or more links to be allocated to the first network slice. To determine is configured to be based on the one or more requirements, the first priority, and the set of available resources in the communications network. The first entity is further configured to send, to the another entity configured to operate in the communications network, the indication. The indication is configured to be based on the one or more links configured to be determined.

According to a fifth aspect of embodiments herein, the object is achieved by the second entity, for providing a service in the communications network. The second entity is configured to operate in the communications network. The second entity is further configured to provide, to the first entity configured to operate in the communications network, the request for the one or more links to be allocated to a first network slice to provide the service in the communications network. The one or more links are configured to connect the one or more nodes in the communications network via the one or more paths. The request is configured to indicate at least one of: a) the one or more requirements to be met by the one or more links, and b) the first priority to be assigned to the first network slice. The second entity is further configured to receive, from the first entity, the response to the request configured to be provided.

According to a sixth aspect of embodiments herein, the object is achieved by the third entity. The third entity is configured to operate in the communications network. The third entity is further configured to receive, from the first entity configured to operate in the communications network, the indication. The indication is configured to indicate the warning about the status of the one or more second network slices. The warning is configured to indicate one of: a) the reduction from the full requirement satisfaction of the one or more second network slices, and b) the de-allocation of at least one of the one or more second network slices. The one or more second network slices are configured to have been assigned the one or more second allocations of resources. To receive is configured to be based on the respective second priority configured to be assigned to the one or more second allocations. The third entity is further configured to initiate performing the operation and maintenance action in the communications network to cease the warning configured to be indicated, based on the indication configured to be received.

According to a seventh aspect of embodiments herein, the object is achieved by a computer program, comprising instructions which, when executed on at least one processor, cause the at least one processor to carry out the method performed by the first entity.

According to an eighth aspect of embodiments herein, the object is achieved by a computer-readable storage medium, having stored thereon the computer program, comprising instructions which, when executed on at least one processor, cause the at least one processor to carry out the method performed by the first entity.

According to a ninth aspect of embodiments herein, the object is achieved by a computer program, comprising instructions which, when executed on at least one processor, cause the at least one processor to carry out the method performed by the second entity.

According to a tenth aspect of embodiments herein, the object is achieved by a computer-readable storage medium, having stored thereon the computer program, comprising instructions which, when executed on at least one processor, cause the at least one processor to carry out the method performed by the second entity.

According to an eleventh aspect of embodiments herein, the object is achieved by a computer program, comprising instructions which, when executed on at least one processor, cause the at least one processor to carry out the method performed by the third entity.

According to a twelfth aspect of embodiments herein, the object is achieved by a computer-readable storage medium, having stored thereon the computer program, comprising instructions which, when executed on at least one processor, cause the at least one processor to carry out the method performed by the third entity.

By the first entity obtaining the request and then determining the one or more links based on the one or more requirements, the first priority, and the set of available resources in the communications network, the first entity is then enabled to allocate the one or more links in an adaptive way considering the actual resources that may be available on the communications network. The second entity is similarly enabled to provide a response to the allocation request based on such adaptive allocation. Moreover, the first entity is further enabled to then take subsequent actions to attend to the obtained request in an adaptive manner, as will be described below. The third entity, by receiving the indication indicating the warning, is enabled to perform an operation and maintenance action in the communications network to cease the indicated warning and thereby. For example, the third entity may free the link, that is, move traffic to another available link or discard low priority traffic, while re-allocating high priority traffic on other links.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a problem with exiting methods will first be identified and discussed.

Today, in case a vertical or slice consumers want to define a network slice to support a certain service, the current available technology provides the possibility to allocate statically one or more infrastructure resources and network components. Therefore, the number of Physical Network Functions (PNFs)/Virtual Network Functions (VNFs)/Virtual Links (VLs) to allocate to obtain the requested Network Slice is decided in the initial planning phase and does not consider the wanted slice capacity and priority but execute the allocation only in terms of number of PNFs and/or VNFs and VLs to reserve.

The reservation of network resources for the user access is initially planned based on the type of service.

Figure 1:
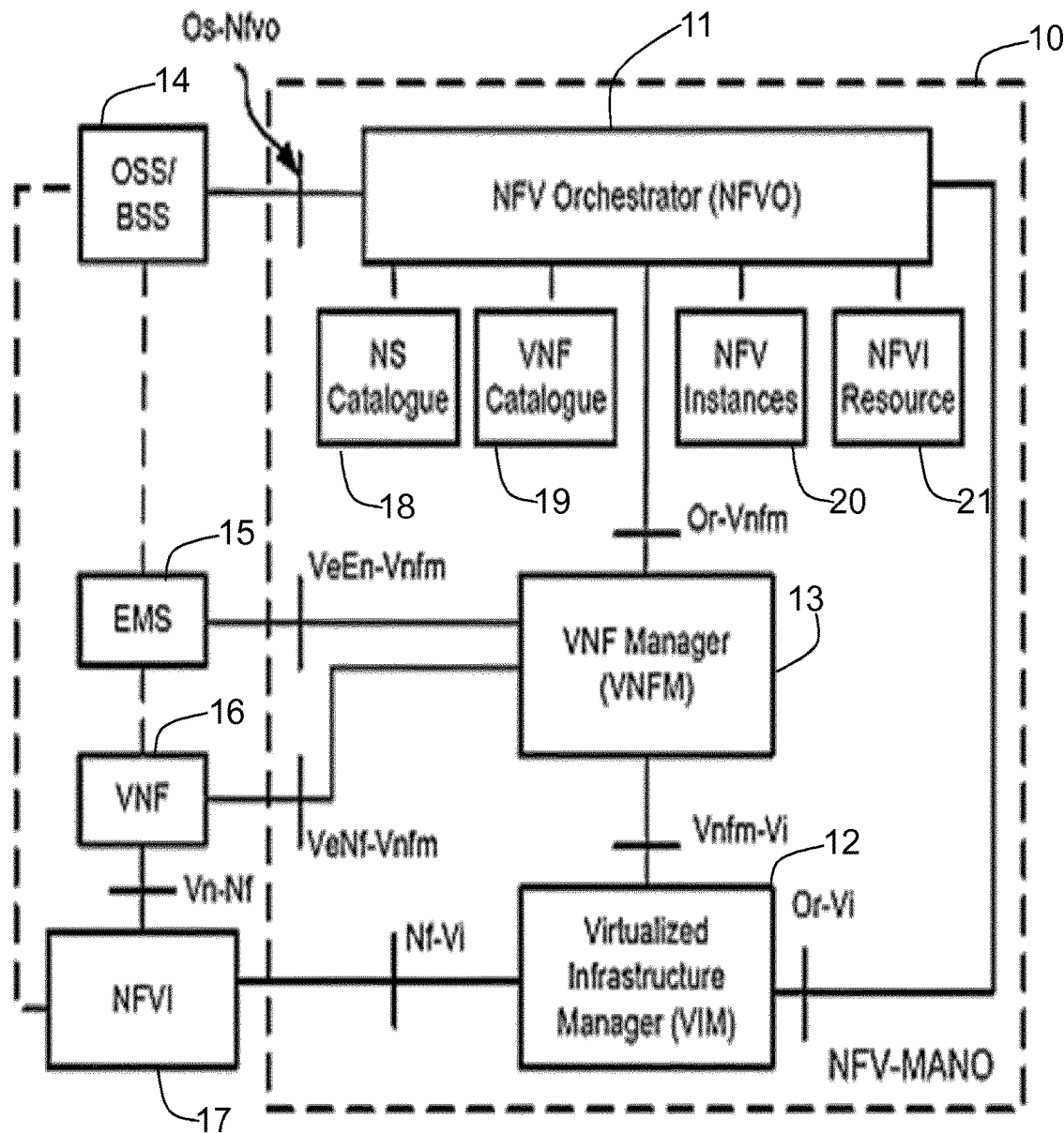
FIG. 1 is a schematic diagram depicting a non-limiting example of a MANO NFV framework, according to existing methods.
Figure 2:
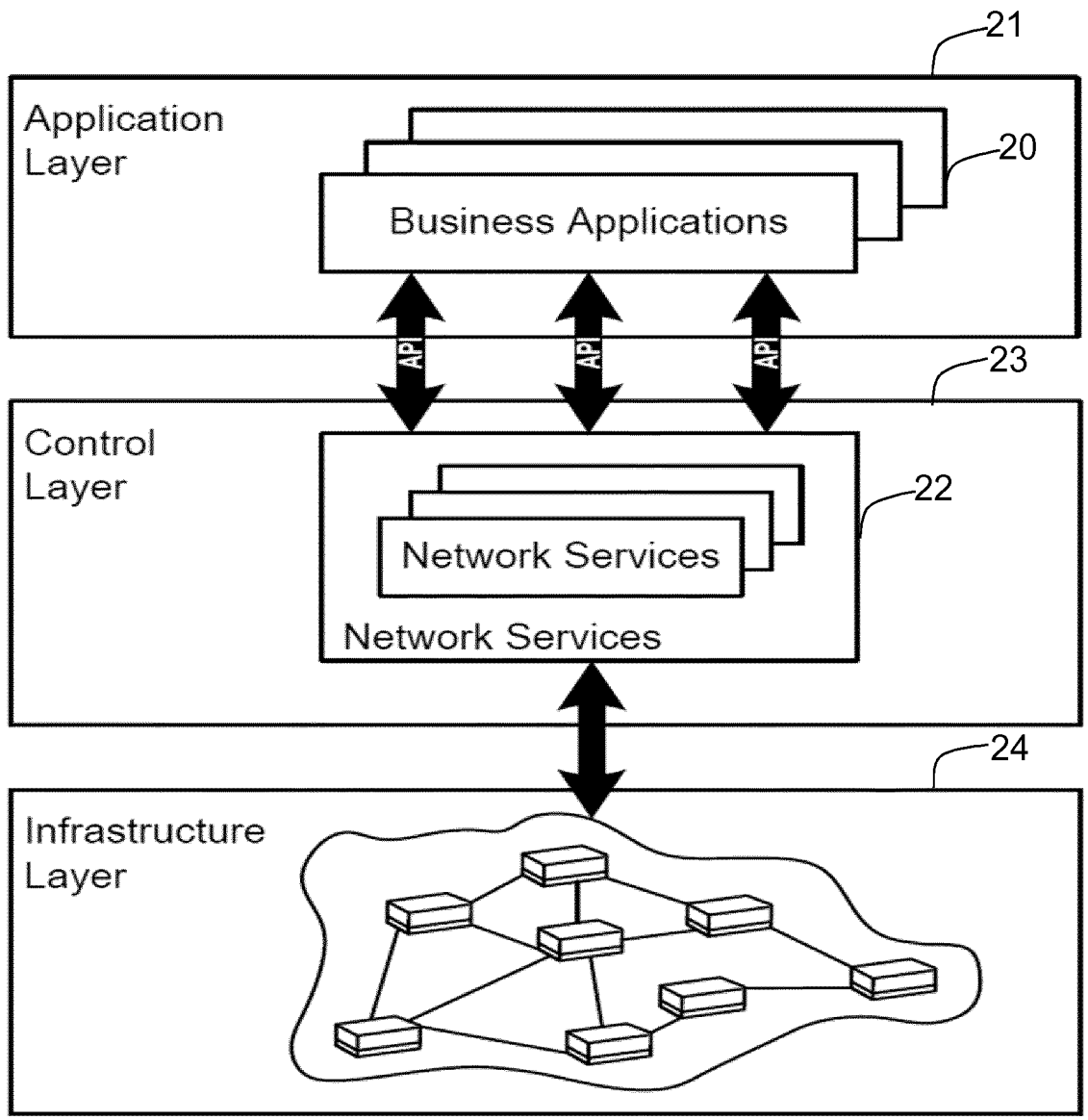
FIG. 2 is a schematic diagram depicting a non-limiting example of SDN Architectures, according to existing methods.
Figure 3:
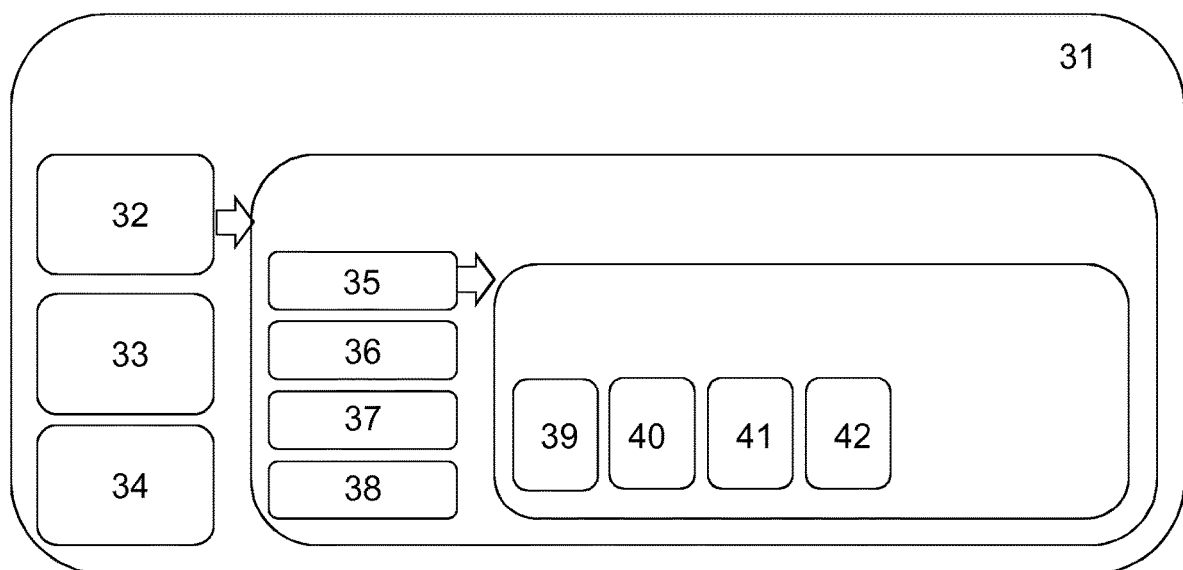
FIG. 3 is a schematic diagram depicting a non-limiting example of an E2E network slice concept, according to existing methods.
Figure 4:
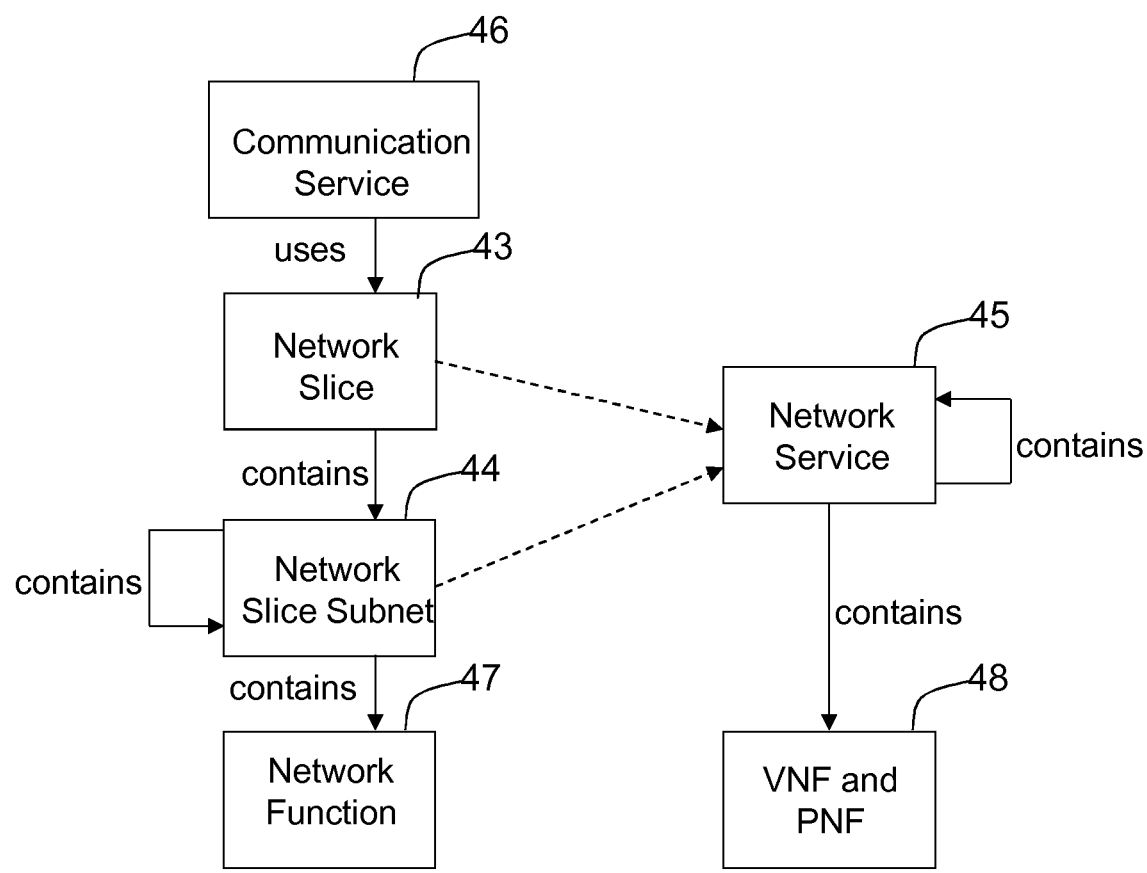
FIG. 4 is a schematic diagram depicting the information model of correspondence among 3GPP and ETSI NFVI, according to existing methods.
Figure 5:
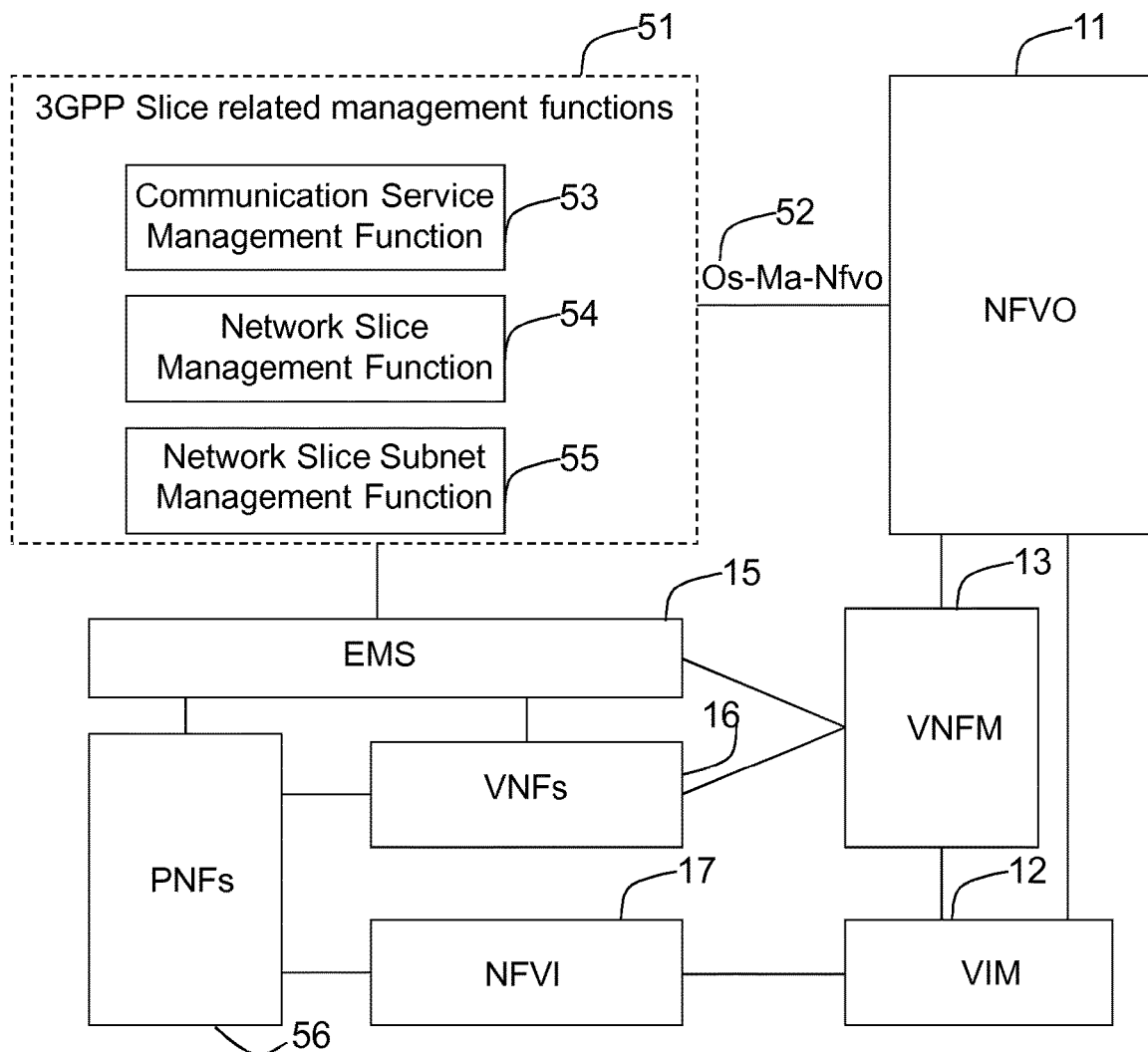
FIG. 5 is a schematic diagram depicting a non-limiting example of a network slice management in the NFV framework and Os-Ma-Nfvo interface, according to existing methods.

This is provided as input to the Network Slice Management Function (NSMF), or to the Network Slice Subnet Management Function (NSSMF), which does not know the real resources availability in the infrastructure. Therefore, the NSMF or the NSSMF will forward this as input to the SDN Controller and NFV Orchestrator, see FIG. 5.

The problem is that the NSMF and NSSMF cannot know if the requested PNFs and/or VNFs and network resources are allocatable to the slice when the query is executed in terms of needed resources, such as Central Processing Unit (CPU), Random Access Memory (RAM), Network and Disk, radio links, computation paths, and specific constrains. In case the requested resources cannot be allocated to the service, this may be for a slice creation or even an increase of the slice capacity, the request will be refused, and the service will not be allocated. This is true even though the slice has a higher priority, e.g., emergency services, compared to the existing services deployed in the network.

PCT/EP2017/063586 titled "Dynamic flavor allocation", has introduced a solution in the NFV, specifically to layer from VNF Manager to VIM by allowing a dynamic instantiation of the VNF based on the wanted service capacity.

Instead, the current SDN algorithms are agnostic and do not consider how the slices will use the resources that have been requested, they will just consider free resources and apply the Shortest-Path-First (SPF) algorithm based on that. The result may not be the best when considering the overall slices set requested on a specific network.

Further disadvantages of current implementation will become apparent to one of skill in the art, through comparison of such complex systems with some aspects of the embodiments, as described below.

Embodiments herein address the existing problem of link allocation by providing a dynamic network slicing allocation based on the capacity that may be needed, and on service priority. According to embodiments herein, the solution may be understood to be relate to creating an E2E network slice instance by dynamically allocating nodes and network resources, based on the requested slice capacity considering the slice priorities. Application and network resources that may be needed to provide the requested slice capacity, may be allocated by a dynamic algorithm allowing the efficient use of underlying infrastructure resources. The allocation algorithm may in particular consider the slice priority when allocating resources to the slices. Resources may be temporarily withdrawn from lower priority slices to satisfy requests from higher priority slices.

The proposed algorithm may allocate links in the SDN domain according to the slices priority, and not based on a first come first served allocation. Furthermore, depending on the use case, different parameters of the link may be considered as the main one to be considered. In particular, for instance, URLLC one of the use cases of the future such as autonomous vehicles, tactile communications, and remote medicine, may be understood to require Latency to be optimized, which is not a parameter included in the current standard when a virtual link is identified. That is, it is not included in the VirtualLinkProfile, an object representing attributes of the virtual link in the current standard, see below in the detailed description section. In the MANO-NFV standard, only the maxBitrate is considered. Other parameters may have to be specified and optimized depending on the use case of the slice.

This added feature, together with the solution proposed in WO-PCT/EP2017/063586 titled "Dynamic flavor allocation", may be used to create a network slice based on one or more requested slice parameters, considering the slice priority.

According to the foregoing, as a summarized overview, embodiments herein may be understood to be related to a network slice instantiation based on slice priority for link allocation.

The embodiments will now be described more fully hereinafter with reference to the accompanying drawings, in which examples are shown. In this section, embodiments herein are illustrated by exemplary embodiments. It should be noted that these embodiments are not mutually exclusive. All possible combinations are not described to simplify the description. Components from one embodiment or example may be tacitly assumed to be present in another embodiment or example and it will be obvious to a person skilled in the art how those components may be used in the other exemplary embodiments.

Figure 6:
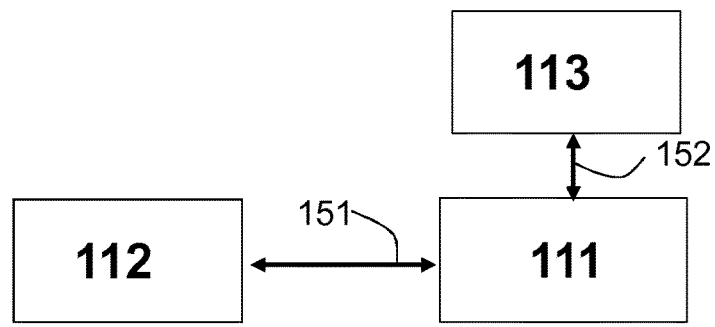
FIG. 6 is a schematic diagram illustrating a non-limiting example of a communications network, according to embodiments herein.
Figure 6:
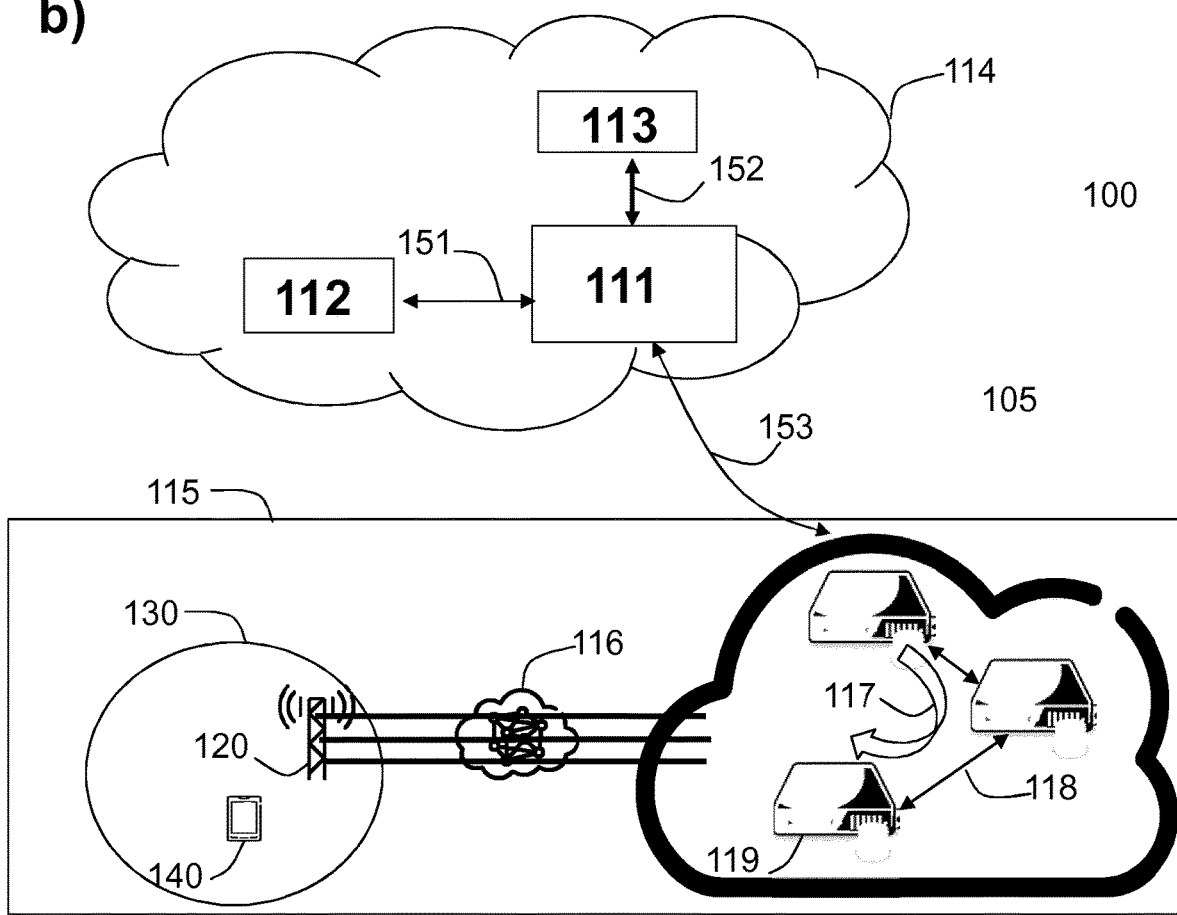

FIG. 6 depicts two non-limiting examples, in panels "a" and "b", respectively, of a communications network 100, in which embodiments herein may be implemented. In some example implementations, such as that depicted in the non-limiting example of FIG. 6a, the communications network 100 may be a computer network. In other example implementations, such as that depicted in the non-limiting example of FIG. 6b, the communications network 100 may be implemented in a telecommunications network 105, sometimes also referred to as a cellular radio system, cellular network or wireless communications system. In some examples, the telecommunications network 105 may comprise network nodes which may serve receiving nodes, such as wireless devices, with serving beams.

In some examples, the telecommunications network 105 may for example be a network such as 5G system, or Next Generation network, or a newer system supporting similar functionality. The telecommunications network 105 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM Enhanced Data Rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

Although terminology from Long Term Evolution (LTE)/5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, e.g., in the sixth generation (6G), the terms used herein may need to be reinterpreted in view of possible terminology changes in future radio access technologies.

The communications network 100 may comprise a plurality of entities. Particularly, the communications network 100 may comprise a plurality of first entities, a plurality of second entities and a plurality of third entities, whereof a first entity 111, a second entity 112, and a third entity 113 are depicted in FIG. 6. Any entities in the plurality of first entities, plurality of second entities and plurality of third entities may be understood to have a description equivalent to that provided herein, respectively, for the first entity 111, the second entity 112, and the third entity 113. In some embodiments, the plurality of second entities may be one or more respective second entities 112.

Any of the first entity 111, the second entity 112, and the third entity 113 may be understood, respectively, as a first computer system, a second computer system, and a third computer system. In some examples, any of the first entity 111, the second entity 112, and the third entity 113, may be implemented as a standalone server in e.g., a host computer in the cloud 114. Any of the first entity 111, the second entity 112, and the third entity 113 may in some examples be a distributed node or distributed server, with some of their respective functions being implemented locally, e.g., by a client manager, and some of its functions implemented in the cloud 114, by e.g., a server manager. Yet in other examples, any of the first entity 111, the second entity 112, and the third entity 113 may also be implemented as processing resources in a server farm.

In some embodiments, any of the first entity 111, the second entity 112, and the third entity 113 may be independent and separated nodes. In other embodiments, any of the first entity 111, the second entity 112, and the third entity 113 may be co-located, or be the same node.

All the possible combinations are not depicted in FIG. 6 to simplify the Figure. In some examples of embodiments herein, the first entity 111 may be an SDN controller, e.g., in 5G, or an entity capable of performing a similar function in the communications network 100. The second entity 112 may, e.g., in 5G, an NSMF, or a node capable of performing a similar function in the communications network 100. The third entity 113 may be a an Operations and Maintenance (O&M) entity, or an entity capable of performing a similar function in the communications network 100.

Any of the second entity and the third entity may be referred to herein as another entity 112,113.

The communications network 100 comprises one or more nodes 115. The one or more nodes 115 may be comprised in one or more edge networks and clouds, and/or one or more core networks and clouds, and their connections 116. The one or more nodes 115 may comprise a core network node, such as the core network node 119 described below, a radio network node, such as the radio network node 120 described below, and a wireless device, such as the wireless device 140 described below. The one or more nodes 115, which may be comprised in the one or more edge networks and clouds, and/or the one or more core networks and clouds, may be connected by one or more paths 117. Each of the one or more paths 117 may comprise one or more links 118. In FIG. 6, and for illustrative purposes only, the one or more paths 117 is represented as a single path comprising two links.

The core network node 119 may be, e.g., a Mobility Management Entity (MME), Access Management Function (AMF), Session Management Function (SMF), Service GW node (SGW), Packet data GW node (PGW), Self-Organizing Network (SON) node, Operation Support System node (OSS), etc.

The communications network 100 may comprise a plurality of radio network nodes, whereof one radio network node 120 is depicted in FIG. 6b. The radio network node 120 may typically be a base station or Transmission Point (TP), or any other network unit capable to serve a wireless device or a machine type node in the communications network 100. The radio network node 120 may be e.g., a 5G gNB, a 4G eNB, or a radio network node in an alternative 5G radio access technology, e.g., fixed or WiFi. The radio network node 120 may be e.g., a Wide Area Base Station, Medium Range Base Station, Local Area Base Station and Home Base Station, based on transmission power and thereby also coverage size. The radio network node 120 may be a stationary relay node or a mobile relay node. The radio network node 120 may support one or several communication technologies, and its name may depend on the technology and terminology used. The radio network node 120 may be directly connected to one or more networks and/or one or more core networks.

The communications network 100 covers a geographical area which may be divided into cell areas, wherein each cell area may be served by a radio network node, although, one radio network node may serve one or several cells. In the non-limiting example depicted in FIG. 6b, the radio network node depicted serves a cell 130.

The communications network 100 may comprise a plurality of wireless devices, whereof a wireless device 140 is depicted in FIG. 6b. The wireless device 140 may be also known as e.g., a user equipment, mobile terminal, wireless terminal and/or mobile station, mobile telephone, cellular telephone, or laptop with wireless capability, or a Customer Premises Equipment (CPE), just to mention some further examples. The wireless device 140 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications network 100. The wireless device 140 may be wireless, i.e., it may be enabled to communicate wirelessly in the communications network 100 and, in some particular examples, may be able to support beamforming transmission. The communication may be performed e.g., between two devices, between a device and a radio network node, and/or between a device and a server. The communication may be performed e.g., via a RAN and possibly one or more core networks, comprised, respectively, within the communications network 100. In some particular embodiments, the wireless device 140 may be an IoT device, e.g., an NB IoT device.

The first entity 111 may communicate with the second entity 112 over a first link 151, e.g., a radio link, a wired link or a virtual link. The first entity 111 may communicate with the third entity 113 over a second link 152, e.g., a radio link, a wired link or a virtual link. The first entity 111 may communicate with the wireless device 140 over a third link 153, e.g., a radio link. The third link 153 may be a direct link or a comprise a plurality of links, e.g., via one or more other nodes, network nodes, radio network nodes or core network nodes.

Any of the first link 151, the second link 152 and the third link 153 may be a direct link or it may go via one or more computer systems or one or more core networks in the communications network 100, or it may go via an optional intermediate network. The intermediate network may be one of, or a combination of more than one of, a public, private or hosted network; the intermediate network, if any, may be a backbone network or the Internet; in particular, the inter- mediate network may comprise two or more sub-networks, which is not shown in FIG. 6.

In general, the usage of "first", "second" and/or "third" herein may be understood to be an arbitrary way to denote different elements or entities, and may be understood to not confer a cumulative or chronological character to the nouns they modify.

Figure 7:
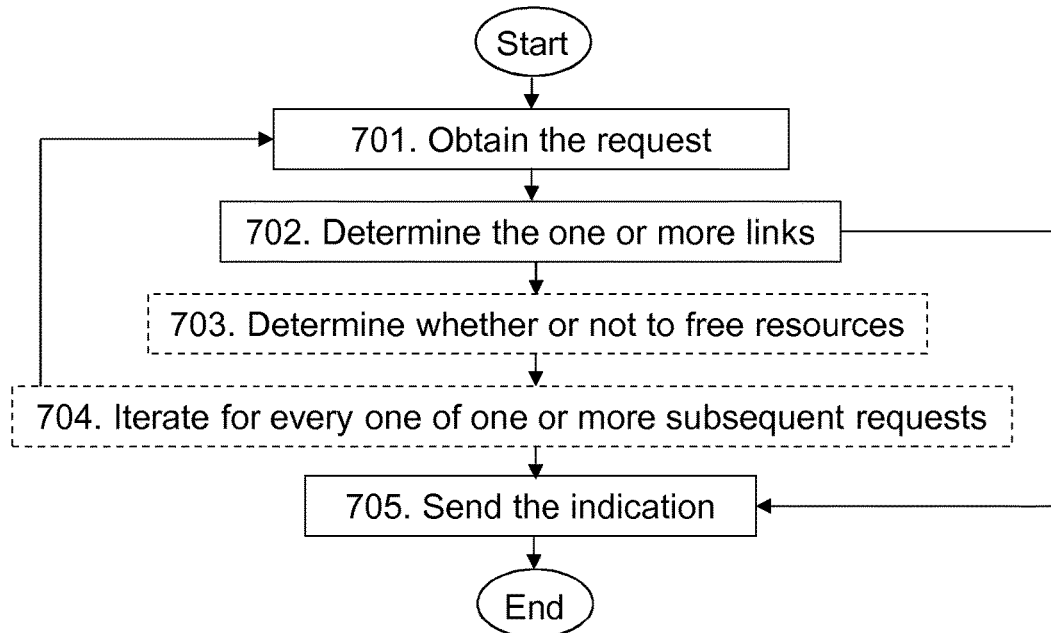
FIG. 7 is a flowchart depicting embodiments of a method in a first entity, according to embodiments herein.

Embodiments of method, performed by the first entity 111, will now be described with reference to the flowchart depicted in FIG. 7. The method may be understood to be for providing a service in the communications network 100. The first entity 111 operates in the communications network 100.

The method may comprise the actions described below. In some embodiments some of the actions may be performed. In some embodiments all the actions may be performed. In FIG. 7, an optional action is indicated with a dashed box. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 701

In the course of communications in the communications network 100, one of the entities in the communications network 100, e.g., a Communication Service Management Function 52, may send a request for a certain type of service to the second entity 112, e.g., the NSMF. A service may be understood as any type of communication service that may be used by an application in Mobile Broad Band (MBB), Machine Type Communications (MTC) and/or enterprise domains, where a network slice may be used to deploy, e.g., an on-demand network. Machine-type communication (MTC) may be understood as a form of data communication which may involve one or more entities which may not necessarily need human interaction. MTC may be used in devices in e.g., utility companies, traffic control, telemedicine, security in business, telemetry. An Enterprise application (EA) may be understood as a large software system platform designed to operate in a corporate environment such as business or government. An EA application may be used in e.g., accounting, finance, human resources, inventory control, manufacturing, marketing, sales, and distribution, and resource planning. Advanced enterprise applications may provide linkages with customers, business partners, and suppliers. MBB may be understood as the marketing term for wireless internet access through a portable modem, USB wireless modem, or a tablet/smartphone or other mobile device. MBB may be provided by e.g., a 3G and/or a 4G Network.

The service, may be provided by instantiating one or more network slices. In order to instantiate the one or more slices to provide the service, the first entity 111 may need to allocate resources, e.g., computational resources, such as the one or more nodes 115, e.g., VNFs, and resources from the infrastructure of the communications network 100, such as computational resources such as Central Processing Unit (CPU), Random Access Memory (RAM), Network and Disk, radio links, computation paths, and specific constrains, to the one or more slices. For each needed path between the one or more nodes 115 that may need to be included in the first network the slice, one or more links 118 may need to be added according to the one or more requirements, e.g., latency, jitter, throughput, bandwidth, etc. The request may specify such one or more requirements, as one or more characteristics or parameters the one or more network slices may need to have. According to embodiments herein, the request may specify, among other parameters, two new parameters: a link capacity (LC) and a priority of the network slice (NSP).

A link may be understood here as a connection between two entities in the communications network 10, for example, between a VNF and a PNF, a PNF and a VNF, a VNF and a VNF, and/or a PNF and PNF. A link, according to embodiments herein may be a physical or a virtual link. The LC may be achieved through the deployment of one or more links 118 and expressed in terms of requirements on the slice, such as latency, jitter, throughput, bandwidth, etc. LC may be one or more of the following:

||+---rwbandwidth
||+---rwthroghput
||+---rwlatency
||+---rwjitter
||+---rwenergyconsumption A priority may be understood as a value that may be assigned to a slice representing an order in which the slice may need to be treated or processed, among a plurality of slices. The slice priority may be expressed as a number, for example from 1 to 100. For example: a network slice instantiated for an ambulance service may have a priority 1, a network slice instantiated for the IoT Service related to the temperature or traffic sensing may have a priority 10, a network slice instantiated for gaming service may have a priority 50, etc. The association between LC and NSP may be considered to allocate free link resources, as described in Action 702, or to re-organize the links and WAN already allocated to be re-allocated to new slice with higher priority, as will be described in Action 703.

Latency may be understood herein as comprising at least one of, an end-to-end (E2E) latency, a user plane latency, and a control plane latency. The E2E latency may be understood as one or more of: a scheduling delay, queuing delay, transmission delay, receiver-side processing, a decoding delay, and a multiple Hybrid automatic repeat request (HARQ) Round Trip Time (RTT).

The user plane latency may be understood as a one-way time it may take to successfully deliver a packet, e.g., in 3GPP.

The control plane latency may be understood as a transition time from a most "battery efficient" state, e.g., Idle state, to the start of a continuous data transfer, e.g., in 3GPP.

The one or more requirements may correspond, in some examples, to the "Service requirements for the 5G system" in 3GPP, as described in TS 22.261 v. 16.0.0, June 2017.

The second entity 112 may then in turn ask the first entity 111, e.g., an SDN controller, to allocate the links that may be needed in the different network segments of the links that may be required.

In accordance with the foregoing, in this Action 701, the first entity 111 obtains, from the second entity 112 operating in the communications network 100, a request for one or more links 118 to be allocated to a first network slice. The first network slice is to provide a service in the communications network 100 via one or more paths 117. The one or more links 118 connect the one or more nodes 115 in the communications network 100. The request indicates at least one of: a) one or more requirements to be met by the one or more links 118, and b) a first priority to be assigned to the first network slice.

Obtaining, may comprise receiving, collecting or gathering. In this Action 701, the obtaining may be implemented, e.g., via the first link 151, and, in some examples, e.g., via the Os-Ma-Nfvo interface.

The first network slice may be e.g., an E2E slice.

A path may be understood as a connection between two entities. The path may be realized by one or more links, which may be one or more radio links, wired links or virtual links.

In some embodiments, the one or more links 118 may comprise at least one of: a radio link and a Wide Area Network link.

In some embodiments, the one or more requirements may be based on at least one of: a value for latency, jitter, throughput, bandwidth and energy consumption, for the one or more paths 117. In some particular embodiments, the one or more requirements may be, for example, the Link Capacity (LC), as described earlier.

The first priority may be understood as a first network slice priority (NSP). The Network Slice Priority may be understood as a new input parameter to the first entity 111, e.g., an SDN controller, to be used in the method to select the links for the first network slice.

In some embodiments, the first entity 111 may manage an SDN controller, and the second entity 112 may manage a Network Slice Management Function. In such embodiments, in this Action 701, the SDN Controller may receive a link request via a VL Descriptor with a given LC and NSP. A VL Descriptor may be understood as an object, a table, which may comprise information that represents a Virtual Link in the communications network 10.

The VL descriptor that may be used is described next, as extracted from the par. 6.3 in the "ETSI GS NFV-IFA 014 V2.1.1 (2016-10) specification", which may be modified with the embodiments herein to comprise the LC and the NSP.

VL Descriptors

TABLE 6.3.2.2-1

Attributes of the NsDf information element

| Attribute | Qualifier | Cardinality | Content | Description |
|---|---|---|---|---|
| nsDfId | M | 1 | Identifier | Identifies this NsDf information element. It identifies a NS DF within the NSD. |
| flavourKey | M | 1 | String | Assurance parameter against which this flavour is being described. The key can be a combination of multiple assurance parameters with a logical relationship between them. The parameters should be present as a monitoredInfo attribute in the NSD. |
| vnfProfile | M | 0...N | VnfProfile | VNF profile to be used for the NS flavour |
| pnfProfile | M | 0...N | PnfProfile | PNF profile to be used for the NS flavour |
| virtualLinkProfile | M | 0...N | VirtualLinkProfile | VL profile to be used for the NS flavour. There shall be at most one profile per constituent VNF. |
| scalingAspect | M | 0...N | NsScalingAspect | The scaling aspects supported by this DF of the NS. |
| affinityOrAntiAffinityGroup | M | 0...N | AffinityOrAntiAffinityGroup | Specifies affinity or anti-affinity relationship applicable between the VNF instances created using different VNFDs, the Virtual Link instances created using different NsVirtualLinkDescs or the nested NS instances created using different NSDs in the same affinity or anti-affinity group. See clause 6.3.5. |

Virtual Link Profile

TABLE 6.3.4.2-1

Attributes of the VirtualLinkProfile information element

| Attribute | Qualifier | Cardinality | Content | Description |
|---|---|---|---|---|
| virtualLinkProfileId | M | 1 | Identifier | Uniquely identifies this VirtualLinkProfile information element. |
| virtualLinkDescId | M | 1 | Identifier (Reference to NsVirtualLinkDesc) | Uniquely references a VLD. |
| flavourId | M | 1 | Identifier (Reference to VIrtualLinkDf) | Identifies a flavour within the VLD. |
| localAffinityOrAntiAffinityRule | M | 0...N | LocalAffinityOrAntiAffinityRule | Specifies affinity and anti-affinity rules applicable between VLs instantiated from the referenced VLD. See clause 6.3.8. |
| affinityOrAntiAffinityGroupId | M | 0...N | Identifier (Reference to AffinityOrAntiAffinity Group) | Identifies an affinity or anti-affinity group the VLs instantiated according to the VlProfile belong to. See note 1. |
| maxBitrateRequirements | M | 1 | LinkBitrateRequirements | Specifies the maximum bitrate requirements for a VL instantiated according to this profile. See clause 6.5.5. See note 2. |
| minBitrateRequirements | M | 1 | LinkBitrateRequirements | Specifies the minimum bitrate requirements for a VL instantiated according to this profile. See clause 6.5.5. See note 2. |

NOTE 1:
Each identifier references an affinity or anti-affinity group which expresses affinity or anti-affinity relationship between the VL(s) using this VirtualLinkProfile and the VL(s) using other VirtualLinkProfile(s) in the same group.
NOTE 2:
These attributes are used to control scaling boundaries.

The request may be an NSSI request. The request may be obtained via a network slice template. A slice template may be understood to describe the one or more requirements for the slice connection as a series of attributes, such as latency, jitter, throughput, bandwidth, and/or energy consumption, although this list may be understood as non-exhaustive. Based on these parameters, a set of VL may be requested based on the attributes defined into VL descriptors.

Network Slice Template

The network slice template that may be used in embodiments herein may comprise the two new parameters described herein: LC and NSP. The following text is a simple example of network slice template where the new network slice priority and link capacity parameters may be added, according to embodiments herein.

```
module: ns-template
+--rw network-slice
  +--rw atomic-component
  | +--connectivity-category
  | | +--rw node
  | | +--rw link
  |+--rwlink-capacity-category
  ||+--rwbandwidth
  ||+--rwthroghput
  ||+--rwlatency
  ||+--rwjitter
  ||+--rwenergyconsumption
  | +--rw storage-category
  | | +--rw ram
  | | +--rw rom
  | | +--rw cache
  | +--rw compute-category
  | +--rw cpu
  | +--rw gpu
  +--rw predefined-function-block
  | +--rw sdn-controller
  | +--rw firewall
  | +--rw vswitch
  | +--rw load-balancer
  +--rw service-profile
  | +--rw qos-agreement
  | +--rw isolation-level
  | +--rw reliability-level
  | +--rwslicepriority-level
  +--rw operation-management
  +--rw construction
  +--rw monitoring
  +--rw get-parameter
```

The first entity 111 may receive as input the slice template, which may comprise the new parameters described herein, namely: a) the Link Capacity (LC) for the slice, which may be expressed in terms of the latency, jitter, throughput, bandwidth, and b) the Network Slice Priority (NSP). These two new parameters may be strictly connected and may allow to fit the best link and Wide Area Network (WAN) allocation and satisfy the Network Slices instantiations with higher priority.

Action 702

For each needed path between the resources, e.g., computational resources such as VNFs, that may need to be included in the first network the slice, one or more links 118 may need to be added according to the one or more requirements, e.g., LC requirements such as latency, jitter, throughput, bandwidth, etc. The first entity 111 may then need to check if there are available resources to guarantee the above one or more requirements for the one or more links 118.

In this Action 702, the first entity 111, determines the one or more links 118 to be allocated to the first network slice. The determining in this Action 701 is based on the one or more requirements, e.g., the LC, the first priority, and a set of available resources in the communications network 100.

Determining may be understood as calculating, predicting, estimating, or similar.

Available resources may be understood as resources that may be free, namely, resources that may have the capacity to support the first network slice, given their current load.

In some embodiments, the first entity 111 may, after determining the one or more links 118, proceed to Action 705, described below.

Action 703

In some embodiments, the set of available resources in the communications network 100 may be insufficient to meet the one or more requirements. In some of such embodiments, the first entity 111 may therefore check if the one or more requirements of the first network slice may be met by reconfiguring a slice with lower priority.

Accordingly, in this Action 703, the first entity 111 may determine whether or not to free resources from one or more existing second allocations of resources assigned to one or more existing second network slices in the communications network 100. The determining in this Action 703 of whether or not to free resources from the existing one or more second allocations may be based on whether or not the first priority is higher than a respective second priority assigned to the one or more second allocations.

In other words, the Network Slice Priority (NSP) may be also used for the allocation of network resources to the first network slice in case of resource shortage, by moving them from the second network slices with lower priority.

EXAMPLE

For example, the first entity 111 may first, according to Action 702, calculate which is the minimum slice latency L(minAval) available summing only free links capacity lat(minAval) without modifying the second network slices with lower priority. If L(minAval) <=L(reqMax), the required maximum latency, then links are booked and assigned to the slice.

If with the available resources L(reqMax) may not be guaranteed, the first entity 111 may check if it may be possible to free resources from already scheduled lower second network slice priorities, impacting their level of service as less as possible.

Where:

L(minBlock) is the sum of lat(minBlock) for all paths used by the first network slice;

lat(minBlock) is the gained latency from the slices with lower priority considering the lower priority second network slice cannot work anymore after this resource subtraction;

lat(minNoBlock) is the gained latency from the second network slices with lower priority when they are set to the minimum latency value they can still work with acceptable grade; and L(minNoBlock) is the sum of lat(minNoBlock) for all paths used by the first network slice, the first entity 111 may calculate the minimum latency L(minNoBlock) summing links capacity lat(minNoBlock).

If L(minNoBlock)<=L(reqMax) then links are booked and assigned to the first network slice.

If also with the gained capacity from lower second network slices, impacting their level of service as less as possible, L(reqMax) is not guaranteed, the first entity 111 may check if it may be possible to reach the requested L(reqMax) using all resources already allowed by lower network second network slice priorities.

The first entity 111 may then calculate the minimum latency L(minBlock) summing links capacity lat(minBlock). If L(minBlock)<=L(reqMax) then links are booked and assigned to the first network slice.

In some embodiments, the request may further indicate a level of acceptance of a degradation of at least one of: the first network slice and any of the one or more existing second network slices. In such embodiments, the determining in Action 703 of whether or not to free resources from the existing one or more second allocations may be further based on the indicated level of acceptance.

The degradation may be understood as an non optimal allocation of a network slice. When there is degradation, the network slice may work, but may not fully guarantee all functionality, and may therefore perform with reduced serviceability.

The degradation of any of the one or more existing second network slices may be understood as a point that may distinguish minBlock and minNoBlock.

For degradation of the first network slice, in case also L(minBlock)>L(reqMax), then an allocation with lower level may be done.

The level of acceptance may be understood as the minimal level for which the network slice may be allocated. That is, a minimal allowed degradation, after which level the network slice may not work at all.

For example, the ns-template may comprise the following:

| +--rw accepted link-capacity-category
 | | +--rw accepted bandwidth
 | | +--rw accepted throughput
 | | +--rw accepted latency
 | | +--rw accepted jitter
 | | +--rw accepted energy consumption That inform about the minimal capacity requested for allocation of the first network slice, which in the future may become the possible degradation level of any of the one or more second network slices.

Other Parameters as Golden Parameter

The golden parameter may be understood as the parameter to be considered first, that is, the one that may be understood as most important for the allocation. The other may be considered later. One of the not golden parameters may, for example, be accepted with a lower value, according to the level of acceptance. Embodiments herein may also consider other parameters as Golden Parameter or together with latency as Golden Parameter.

Little changes may in such event be needed, considering the peculiarity of the considered parameter.

For example, it may be considered that the total latency is equal to the sum of the latency of each path, while this may not be true for jitter, where the total jitter may be minus or equal to the sum of the jitter of each path. Therefore, for jitter, the condition may not be as strict as the latency. End-to-end slice bandwidth and throughput may be limited by the bandwidth and throughput of the sub-slice section with less capacity. Further optimization on the other parameters may only be done without impact on the primary parameter.

Other differences may be on working conditions. Some studies demonstrate that with traffic increase, there may be an increase of latency and a decrease of jitter. Also, according to this, the jitter condition may be less strict of latency condition.

The slice throughput and bandwidth LC may be applicable to each path of the slice, that is, each path may need to satisfy the throughput and bandwidth that may be required.

Action 704

In some embodiments, in this Action 704, the first entity 111 may iterate the obtaining of Action 701, the determining, of Action 702, of the one or more links 118, and the determining, of Action 703, of whether or not to free resources, for every one of one or more subsequent requests respectively received from one or more respective second entities 112 within a time period.

Iterating may be understood as receiving or looping.

For example, the first entity 111 may calculate the minimum latency L(minNoBlock) summing links capacity lat (minNoBlock) according to Action 702. If L(minNoBlock) <=L(reqMax) then links may be booked and assigned to the first network slice.

If also with gained capacity from lower slices, impacting their level of service as less as possible, L(reqMax) may not be guaranteed, the first entity 111 may check if it may be possible to reach the requested L(reqMax) using all resources already allowed by lower network slice priorities.

In some embodiments, the method may be iterated to allocate the slower slices, that may have been impacted by a previous allocation of a higher priority slice, according to their LC and NSP.

Action 705

In this Action 705, the first entity 111 may send, to another entity 112, 113 operating in the communications network 100, an indication based on the determined one or more links 118.

In this Action 705, the sending may be implemented, e.g., via the first link 151, and, in some examples, e.g., via the Os-Ma-Nfvo interface, and/or via the second link 152.

In some embodiments, the indication sent may be based on an outcome of the determinations performed after the iterating 704.

For example, the first entity 111 may return a response to the second entity 112 about the request.

In some examples, an alarm and/or warning may be sent to the another entity 113, e.g., DC operators and/or administrators, to inform them about any problems in allocating the resources that may have come up during any or both of Action 702 and 703, such as degradation of a second network slice inside the accepted capacity tolerance, if the second network slice has been de-allocated waiting for resources to be re-allocated, and no matching resource was available, etc.

The sent indication may accordingly be one of: i) a response to the obtained request, wherein the another entity may be the second entity 112, and ii) a warning about a status of the one or more second network slices, wherein the another entity may be the third entity 113.

In some embodiments wherein the sent indication is the warning status, the another entity 113 may be managed by an operator of the communications network 100.

If the first entity 111 is unable to find the resources that may be needed to instantiate the first network slice, the request may be rejected. For example, if the one or more requirements cannot be satisfied, it may be understood to mean that it may not be possible to create the first network slice with the requested LC, so the obtained request may be rejected.

According to the foregoing, in some embodiments, the response may comprise one of: a) a rejection of the request, wherein the set of available resources in the communications network 100 may be insufficient to meet the one or more requirements, b) an acceptance of the request with the one or more requirements being met in part, and c) an acceptance of the request with the one or more requirements being fully met.

In some embodiments, the warning may indicate one of: i) a reduction from a full requirement satisfaction of the one or more second network slices, and ii) a de-allocation of at least one of the one or more second network slices.

By performing the Actions just described, the first entity 111 may therefore be enabled to: a) execute the first network slice request on the MANO to allocate the one or more links 118 using the new parameters, b) make a better use of all available resources and c) have the possibility to move resources from an already allocated slice with low priority to a new slice with higher priority.

Figure 8:
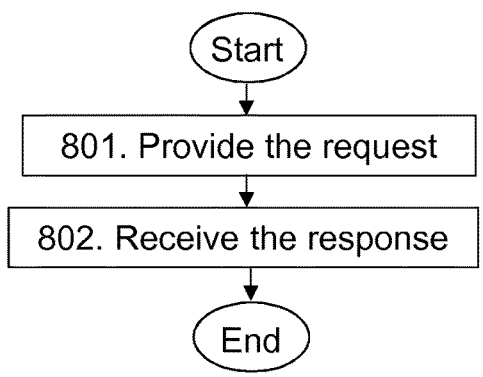
FIG. 8 is a flowchart depicting embodiments of a method in a second entity, according to embodiments herein.

Embodiments of a method performed by the second entity 112, will now be described with reference to the flowchart depicted in FIG. 8. The method is for providing the service in the communications network 100. The second entity 112 operates in the communications network 100.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first entity 111, and will thus not be repeated here to simplify the description. For example, the first entity 111 may manage an SDN controller, and the second entity 112 may manage an NSMF.

Action 801

In this Action 801, the second entity 112 provides, to the first entity 111 operating in the communications network 100, the request for the one or more links 118 to be allocated to the first network slice to provide the service in the communications network 100. The one or more links 118 connect the one or more nodes 115 in the communications network 100 via the one or more paths 117. The request indicates the at least one of: a) the one or more requirements to be met by the one or more links 118, and b) the first priority to be assigned to the first network slice.

Providing may be understood as e.g., sending or sharing, for example, via the first link 151, and, in some examples, e.g., via the Os-Ma-Nfvo interface.

In some embodiments, the request may further indicate the level of acceptance of the degradation of at least one of: the first network slice and any of the one or more existing second network slices. In some of such embodiments, the received response may be further based on the indicated level of acceptance.

The one or more requirements may be based on at least one of: the latency value of the one or more paths 117, jitter, throughput, bandwidth, energy consumption and latency.

This Action 801 may be understood to take place in a context wherein the service orchestrator, may have send a request for a certain type of service to the second entity 112, e.g., an SDN manager such as an NSMF. According to the requested capacity of the first network slice, e.g., an E2E slice, the second entity 112 may breakdown the corresponding requests to involved infrastructure segments that may be managed by the corresponding NSSMF. For each infrastructure segment, it may pass towards the first entity 111, the SDN controller, the request to allocate the link capacity and, e.g., to the NFVO the request to allocate the network function capacity. The Network Function Capacity may be achieved through the deployment of one or more VNF instances which may allocate a portion of such capacity. PCT/EP2017/063586, entitled "Dynamic flavor allocation" describes a possible implementation method to allocate the Network Function Capacity.

Action 802

After providing the request to the first entity 111, in this Action 802, the second entity 112 receives, from the first entity 111, the response to the provided request.

The receiving may be implemented, e.g., via the first link 151, and, in some examples, e.g., via the Os-Ma-Nfvo interface.

In some embodiments, the response may comprise one of: a) the rejection of the request, wherein the set of available resources in the communications network 100 may be insufficient to meet the one or more requirements, b) the acceptance of the request with the one or more requirements being met in part, and c) the acceptance of the request with the one or more requirements being fully met.

In some embodiments, the one or more links 118 may comprise at least one of: a radio link and a Wide Area Network link.

Figure 9:
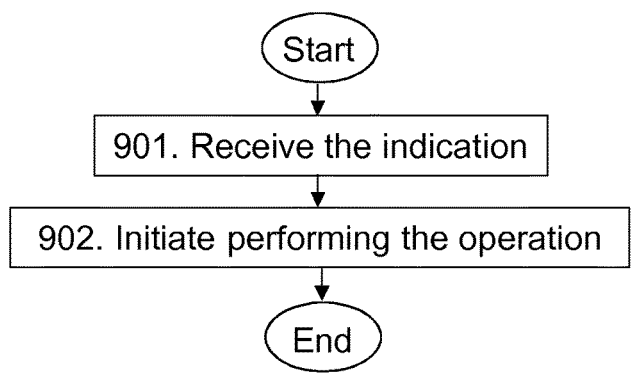
FIG. 9 is a flowchart depicting embodiments of a method in a third entity, according to embodiments herein.

Embodiments of a method performed by the third entity 113, will now be described with reference to the flowchart depicted in FIG. 9. The third entity 113 operates in the communications network 100.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first entity 111, and will thus not be repeated here to simplify the description. For example, the first entity 111 may manage an SDN controller, and the third entity 113 may manage an NSMF.

Action 901

In this Action 901, the third entity 113 receives, from the first entity 111 operating in the communications network 100, the indication indicating the warning about the status of the one or more second network slices. The warning indicates one of: a) the reduction from a full requirement satisfaction of the one or more second network slices, and b) the de-allocation of at least one of the one or more second network slices. The one or more second network slices have assigned the one or more second allocations of resources. The receiving in this Action 901 is based on a respective second priority assigned to the one or more second allocations.

The receiving may be implemented, e.g., via the second link 152.

Action 902

After receiving the indication from the first entity 111, in this Action 902, the third entity 113 initiates performing an operation and maintenance action in the communications network 100 to cease the indicated warning, based on the received indication.

The operation may be, for example, to add new resources, to change the LC and NSP for any of the one or more second network slices, etc. The third entity 113, by being notified, may then be enabled to gracefully free the link, that is to move traffic on other available link or links, or discard low priority traffic while re-allocating high priority traffic on other links.

Figure 10:
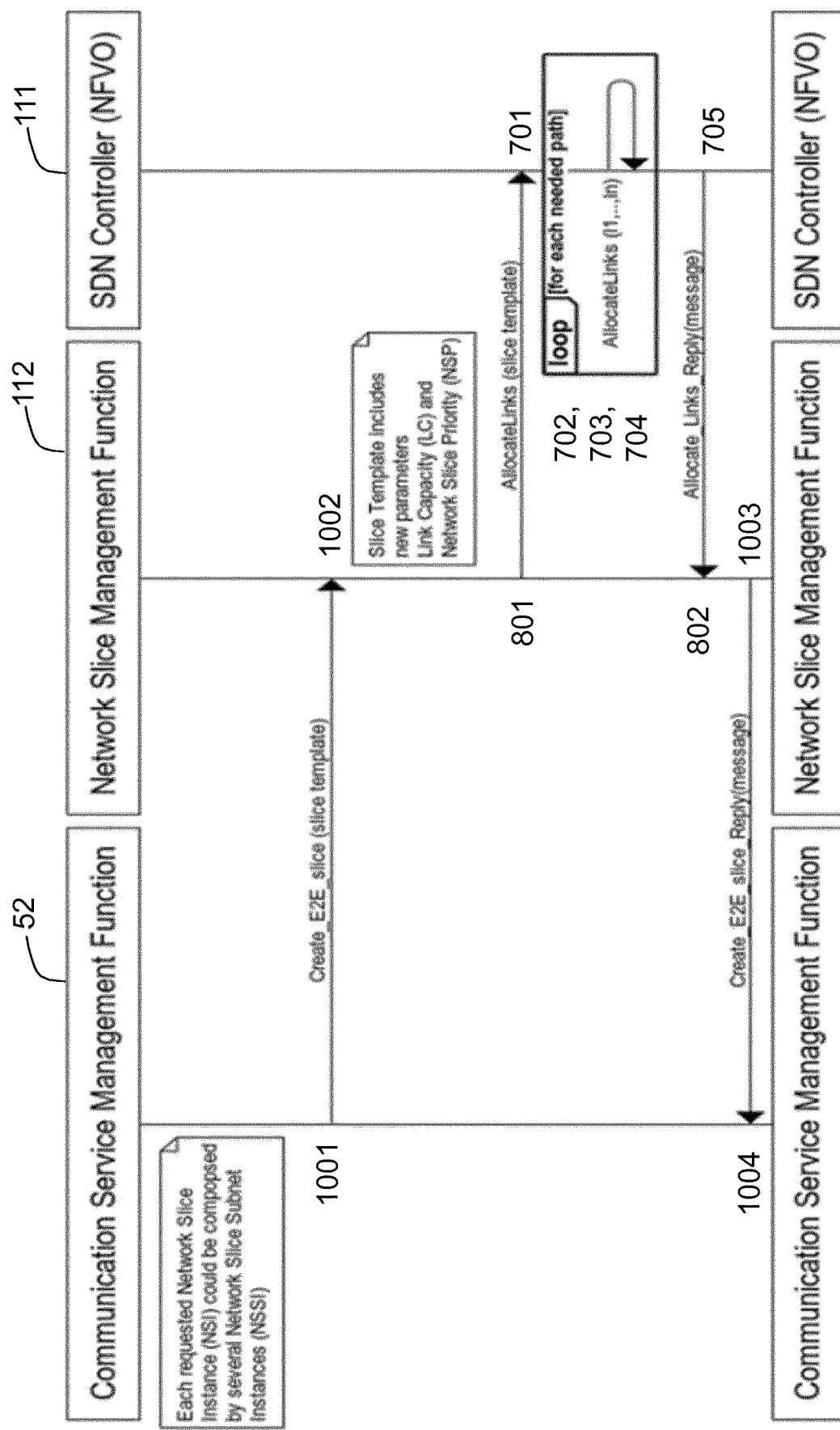
FIG. 10 is a schematic diagram depicting a non-limiting example of signalling between entities in a communications network, according to embodiments herein.

FIG. 10 is a sequence diagram depicting a non-limiting example of embodiments herein, for link allocation to the first network slice, here an E2E network slice instance, using LC and NSP. In this non-limiting example, the first entity 111 is an SDN controller, e.g., an NFVO and the second entity 112 is an NSMF. The diagram depicts an example of the creation of the E2E network slice instance according to embodiments herein. The signalling flow in this non-limiting example is the following, according to the numbering depicted in FIG. 7: At 1001, the service orchestrator, a Communication Service Management Function, sends a request for a certain type of service specifying, among other parameters, the link capacity and the network slice priority. The request comprises a slice template, which in turn includes the new parameters, LC and NSP. It is the SDN manager, after receiving the request at 1002, that in turn asks, in agreement with Action 801, the SDN Controller, or SDN controllers, to allocate the needed links in the different network segments via an AllocateLinks request, which comprises the slice template. For each needed path of the one or more paths 117, the SDN controller loops through Action 702, Action 703 and Action 704. In accordance with Action 705, the SDN controller then sends the indication as an Allocate_Links_Reply message. At 1003, the NSMF sends a Create_E2E_slice_Reply message to the Communication Service Management Function, which is received at 1004.

EXAMPLES

The methods described herein will now be illustrated with two non-limiting particular examples.

Example of the Method Performed by the Second Entity 112 as an NSMF

The goal of this non-limiting example may be understood to be to provide an optimized allocation of links to the first network slice, an E2E network slice instance, considering the new parameters Link Capacity and Network Slice Priority provided via slice template.

Inputs

The second entity 112 receives as input a slice template including the following new parameters: a) the Link Capacity (LC) for the first network slice, which is expressed in terms of the latency, jitter, throughput, bandwidth, and b) the Network Slice Priority (NSP).

Method

Step 0:
The NSMF receives a new slice request via the template with a given LC and NSP, as well as other optional parameters, such as the accepted capacity tolerance.

In case the requested Network Slice Instance (NSI) is composed by several Network Slice Subnet Instances (NSSI), e.g., one NSSI for the RAN, another NSSI for the core network, a third one for the RAN of a different administrative operator, the NSMF may break down the slice request into multiple requests to relevant NSSMFs. Each NSSMF may receive a NSSI request via a template with given LC and NSP.

Step 1:
The NSMF/NSSMF may send, according to Action 801, the slice template containing the requested LC and the NSP to the NFVO through the Os-Ma-Nfvo interface, see FIG. 5.

The SDN Controller embedded into the NFVO, may implement the method according to embodiments herein to allocate to the Slice Instance (NSI/NSSI) the one or more links 118 between computational resources, e.g., VNFs. These results may be used by the relevant SDN controllers to allocate one or more links.

Step 2:
In case the allocation is unsuccessful, the NSMF/NSSMF may reject the new slide request and terminate the method. Any VNFs already allocated to the slice may then need to be released. In case any links have already been allocated to the slice, they may also need to be released.

Step 3:
The new NSI is successfully allocated.

Example of the Method Performed by the First Entity 111 as an SDN Controller (NFVO)

In this example, latency is used as the Golden Parameter.

Definitions:

lat(minAval) is the minimum path latency available without impacting lower priority second network slices;

lat(minNoBlock) is the gained latency from the second network slices with lower priority when they are set to the minimum latency value they can still work with acceptable grade;

lat(minBlock) is the gained latency from the second network slices with lower priority considering the lower priority second network slice cannot work anymore after this resource subtraction;

L(minAval) is the sum of lat(minAval) for all paths used by the first network slice;

L(minNoBlock) is the sum of lat(minNoBlock) for all paths used by the first network slice:

L(minBlock) is the sum of lat(minBlock) for all paths used by the first network slice:

Input Parameters

Required max latency: L(reqMax)
Needed links: nLink

Method

Step 0:

The SDN Controller, according to Action 701, receives a link request via VL Descriptor with given LC and NSP;

Step 1:

for each needed path between computational resources, e.g., VNFs, comprised in the first network slice, the one or more links 118 may need to be added according to the Link Capacity requirements, e.g., latency, jitter, throughput, bandwidth, etc. The SDN Controller may need to check, according to Action 702, if there are available resources to guarantee the above requirements for the link. The following condition may need to be checked:

a) For each needed path exist links with a total latency lat(minBlock)<=L(reqMax) already available among free links or reconfiguring a slice with lower priority.

If the condition is not satisfied, it means that it is not possible to create the first network slice with requested Link Capacity, so the request is rejected by sending the indication of Action 705.

Step 2.1:

Calculate, according to Action 702, which is the minimum slice latency L(minAval) available summing only free links capacity lat(minAval) without modifying slices with lower priority. If L(minAval)<=L(reqMax) then links are booked and assigned to the slice. Continue with Step 4.

If with available resources L(reqMax) is not guaranteed, the first entity 111 may check, according to Action 703, if it is possible to free resources from already scheduled lower network slice priorities, impacting their level of service as less as possible.

Step 2.2:

Calculate, according to Action 703, the minimum latency L(minNoBlock) summing links capacity lat(minNoBlock). If L(minNoBlock)<=L(reqMax) then links are booked and assigned to the slice. Continue with Step 3.

If also with gained capacity from lower slices, impacting their level of service as little as possible, L(reqMax) is not guaranteed, the first entity 111 may check, according to Action 703, if it is possible to reach the requested L(reqMax) using all resources already allowed by lower network slice priorities.

Step 2.3:

Calculate, according to Action 703, the minimum latency L(minBlock) summing links capacity lat(minBlock). If L(minBlock)<=L(reqMax) then links are booked and assigned to the slice. Continue with Step 3.

Step 2.4:

If there is no way to find the needed resources to instantiate the new Link, the request is rejected by sending the indication of Action 705.

Step 3:

The first network slice may be able to be created with the requested Link capacity, using resources allocated for other low priority slices, according to Action 704, The following actions may need to be executed:

Return a response to the second entity 112, according to Action 705, to NSMF/NSSMF, about the link request.

If possible iterate, according to Action 704, the method to allocate the slower second network slices, impacted by previous allocation of a higher priority slice, according to their LC and NSP.

Alarms/Warnings may be sent to the third entity 113, according to Action 705, to the DC operators/administrators to inform about the resources problems such as: slice degradation inside the accepted capacity tolerance, slice de-allocated waiting for resources to be re-allocated, no matching resource available, etc.

End

Step 4:

Return a response, according to Action 705, to NSMF/NSSMF about the link request.

As a summarized overview of the foregoing in other words, embodiments herein address the existing problem of link allocation creating an E2E network slice by initially allocating node and network resources, based on the wanted slice capacity. The actual parameter for which the capacity may be optimized may be chosen dynamically in the method. Furthermore, the method may be extended to optimize more than one parameter.

Embodiments herein may comprise introducing in the interfaces among the Network Slice Management Function (NSMF) and Network Slice Subnet Management Function (NSSMF), SDN Controller and NFVO some new parameters such as network function capacity, link capacity and network slice priority.

Finally, the embodiments herein may comprise the definition of the interfaces between NSMF, the NSSMF and SDN controller for the link capacity allocation to submit the new parameters to the underlying layers to proceed with the physical allocations. For example, the interfaces depicted in FIG. 5 may be modified to add the changes for LC and NSP according to embodiments described herein.

One advantage of embodiments herein is that the one or more paths may be allocated according to the application capacity to deliver. Embodiments herein may be understood to allocate the one or more links in an adaptive way considering the actual resources that may be available on the communications network 100. Another advantage of embodiments herein is that they may increase the number of successful network slice allocations when resources are limited. A further advantage of embodiments herein is that they may allow to temporary move resources, e.g., radio links or WAN links, between network slices based on the network service priority. Considering more relevant the slice with higher priority and stopping or reducing the slices with lower priority. Yet another advantage of embodiments herein is that the optimization may be understood to allow delivering of the capacity with lower CAPital EXpenditure (CAPEX). A further advantage of embodiments herein is that the possibility to handle different parameters according to the priority may be used to optimize links also for energy consumption reduction, either changing the golden parameter to be used, or extending the method to energy consumption. Moreover, automatic successful allocations and re-allocations of a link and node resources may allow OPerating EXpenditure (OPEX) savings. Furthermore, embodiments herein may increase the maximum capability and serviceability. Another advantage of embodiments herein is that they may provide a guarantee in service performance of the communications network 100, where redundancy schemes may be implemented.

Moreover, the same proposed embodiments may be used to ensure slice isolation. Considering the actual capacity of the slice, the optimization method may be used to prevent over use of the capacity, to reallocate resources based on an indication on abnormal usage from the slice. This may be obtained setting the capacity to a specified amount and at the same time reducing the priority of the slice.

Figure 11:
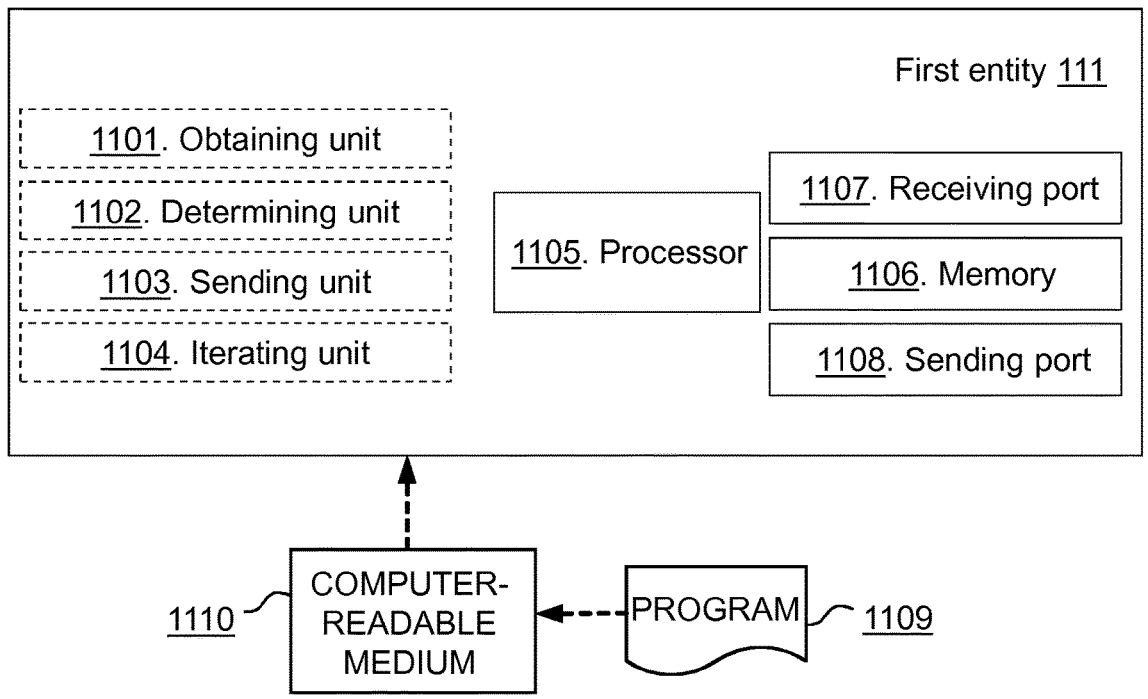
FIG. 11 is a schematic block diagram illustrating two non-limiting examples, a) and b), of a first entity, according to embodiments herein.
Figure 11:
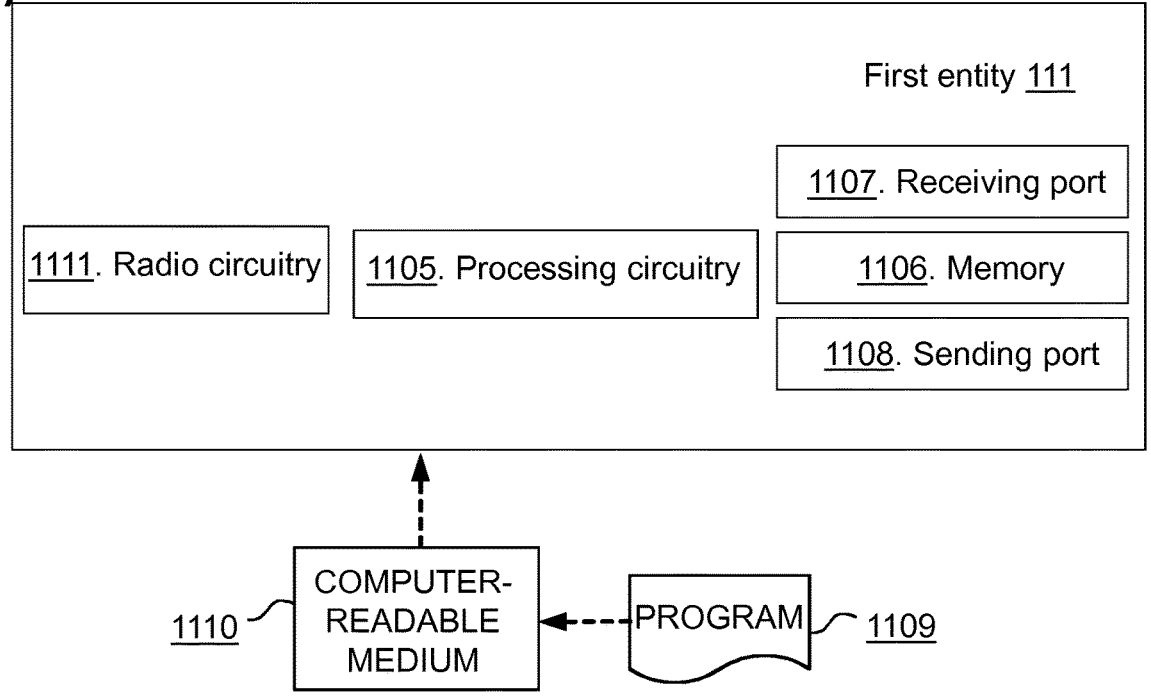

FIG. 11 depicts two different examples in panels a) and b), respectively, of the arrangement that the first entity 111 may comprise to perform the method actions described above in relation to FIG. 7. In some embodiments, the first entity 111 may comprise the following arrangement depicted in FIG. 11a. The first entity 111 may be considered to be for providing the service in the communications network 100. The first entity 111 is configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 11, optional boxes are indicated by dashed lines. The detailed description of some of the following corresponds to the same references provided above, in relation to the actions described for the first entity 111, and will thus not be repeated here. For example, the one or more links 118 may be configured to comprise at least one of: a radio link and a Wide Area Network link.

The first entity 111 is configured to, e.g. by means of an obtaining unit 1101 within the first entity 111 configured to, obtain, from the second entity 112 configured to operate in the communications network 100, the request for the one or more links 118 to be allocated to the first network slice to provide the service in the communications network 100 via the one or more paths 117. The one or more links 118 may be configured to connect the one or more nodes 115 in the communications network 100. The request may be configured to indicate at least one of: a) the one or more requirements to be met by the one or more links 118, and b) the first priority to be assigned to the first network slice.

The first entity 111 is also configured to, e.g. by means of a determining unit 1102 within the first entity 111 configured to, determine the one or more links 118 to be allocated to the first network slice, wherein to determine is configured to be based on the one or more requirements, the first priority, and a set of available resources in the communications network 100.

In some embodiments, the first entity 111 may be configured to, e.g. by means of a sending unit 1103 within the first entity 111 configured to, send, to the another entity 112, 113 configured to operate in the communications network 100, the indication configured to be based on the one or more links 118 configured to be determined.

In some embodiments, wherein the set of available resources in the communications network 100 may be insufficient to meet the one or more requirements, the first entity 111 may be further configured to, e.g. by means of the determining unit 1102, determine whether or not to free resources from one or more existing second allocations of resources configured to be assigned to the one or more existing second network slices in the communications network 100. To determine whether or not to free resources from the existing one or more second allocations may be configured to be based on whether or not the first priority is higher than a respective second priority configured to be assigned to the one or more second allocations.

In some embodiments, the first entity 111 may be further configured to, e.g. by means of an iterating unit 1104 within the first entity 111 configured to, iterate the obtaining, the determining of the one or more links 118, and the determining of whether or not to free resources, for every one of one or more subsequent requests configured to be respectively received from one or more respective second entities 112 within a time period. The indication configured to be sent may be configured to be based on the outcome of the determinations configured to be performed after the iterating.

In some embodiments, the request may be further configured to indicate the level of acceptance of the degradation of at least one of: the first network slice and any of the one or more existing second network slices. To determine whether or not to free resources from the existing one or more second allocations may be further configured to be based on the level of acceptance configured to be indicated.

In some embodiments, the one or more requirements may be configured to be based on at least one of: the value for latency, jitter, throughput, bandwidth and energy consumption, for the one or more paths 117.

The indication configured to be sent may be configured to be one of: i) the response to the request configured to be obtained, wherein the another entity may be configured to be the second entity 112, and ii) the warning about the status of the one or more second network slices. The another entity 113 may be configured to be managed by the operator of the communications network 100.

In some embodiments, the response may be configured to comprise one of: a) the rejection of the request, wherein the set of available resources in the communications network 100 may be insufficient to meet the one or more requirements, b) the acceptance of the request with the one or more requirements being met in part, and c) the acceptance of the request with the one or more requirements being fully met.

The warning may be configured to indicate one of: i) the reduction from a full requirement satisfaction of the one or more second network slices, and ii) the de-allocation of at least one of the one or more second network slices.

In some embodiments, the first entity 111 may be configured to manage a Software Defined Network controller, and the second entity 112 may be configured to manage a Network Slice Management Function.

The embodiments herein may be implemented through one or more processors, such as a processor 1105 in the first entity 111 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the first entity 111. One such carrier may be in the form of a CD ROM disc. It is however feasible with other data carriers such as a memory stick. The computer program code may furthermore be provided as pure program code on a server and downloaded to the first entity 111.

The first entity 111 may further comprise a memory 1106 comprising one or more memory units. The memory 1106 is arranged to be used to store obtained information, store data, configurations, schedulings, and applications etc. to perform the methods herein when being executed in the first entity 111.

In some embodiments, the first entity 111 may receive information from, e.g., the second entity 112, the third entity 113, the plurality of second entities, e.g., the one or more respective second entities 112, the plurality of third entities, and/or the one or more nodes 115 through a receiving port 1107. In some examples, the receiving port 1107 may be, for example, connected to one or more antennas in the first entity 111. In other embodiments, the first entity 111 may receive information from another structure in the communications network 100 through the receiving port 1107. Since the receiving port 1107 may be in communication with the processor 1105, the receiving port 1107 may then send the received information to the processor 1105. The receiving port 1107 may also be configured to receive other information.

The processor 1105 in the first entity 111 may be further configured to transmit or send information to e.g., the second entity 112, the third entity 113, the plurality of second entities, e.g., the one or more respective second entities 112, the plurality of third entities, the one or more nodes 115, and/or another structure in the communications network 100, through a sending port 1108, which may be in communication with the processor 1105, and the memory 1106.

Those skilled in the art will also appreciate that any of the units 1101-1104 described above may refer to a combination of analog and digital circuits, and/or one or more processors configured with software and/or firmware, e.g., stored in memory, that, when executed by the one or more processors such as the processor 1105, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 1101-1104 described above may be the processor 1105 of the first entity 111, or an application running on such processor.

Thus, the methods according to the embodiments described herein for the first entity 111 may be respectively implemented by means of a computer program 1109 product, comprising instructions, i.e., software code portions, which, when executed on at least one processor 1105, cause the at least one processor 1105 to carry out the actions described herein, as performed by the first entity 111. The computer program 1109 product may be stored on a computer-readable storage medium 1110. The computer-readable storage medium 1110, having stored thereon the computer program 1109, may comprise instructions which, when executed on at least one processor 1105, cause the at least one processor 1105 to carry out the actions described herein, as performed by the first entity 111. In some embodiments, the computer-readable storage medium 1110 may be a non-transitory computer-readable storage medium, such as a CD ROM disc, a memory stick, or stored in the cloud space. In other embodiments, the computer program 1109 product may be stored on a carrier containing the computer program, wherein the carrier is one of an electronic signal, optical signal, radio signal, or the computer-readable storage medium 1110, as described above.

The first entity 111 may comprise an interface unit to facilitate communications between the first entity 111 and other nodes or devices, e.g., the second entity 112, the third entity 113, the plurality of second entities, e.g., the one or more respective second entities 112, the plurality of third entities, and/or the one or more nodes 115. In some particular examples, the interface may, for example, include a transceiver configured to transmit and receive radio signals over an air interface in accordance with a suitable standard.

In other embodiments, the first entity 111 may comprise the following arrangement depicted in FIG. 11b. The first entity 111 may comprise a processing circuitry 1105, e.g., one or more processors such as the processor 1105, in the first entity 111 and the memory 1106. The first entity 111 may also comprise a radio circuitry 1111, which may comprise e.g., the receiving port 1107 and the sending port 1108. The processing circuitry 1105 may be configured to, or operable to, perform the method actions according to FIG. 7, in a similar manner as that described in relation to FIG. 11a. The radio circuitry 1111 may be configured to set up and maintain at least a wireless connection with the second entity 112, the third entity 113, the plurality of second entities, e.g., the one or more respective second entities 112, the plurality of third entities, and/or the one or more nodes 115.

Hence, embodiments herein also relate to the first entity 111 operative providing the service in the communications network 100, the first entity 111 being operative to operate in the communications network 100. The first entity 111 may comprise the processing circuitry 1105 and the memory 1106, said memory 1106 containing instructions executable by said processing circuitry 1105, whereby the first entity 111 is further operative to perform the actions described herein in relation to the first entity 111, e.g., in FIG. 7.

Figure 12:
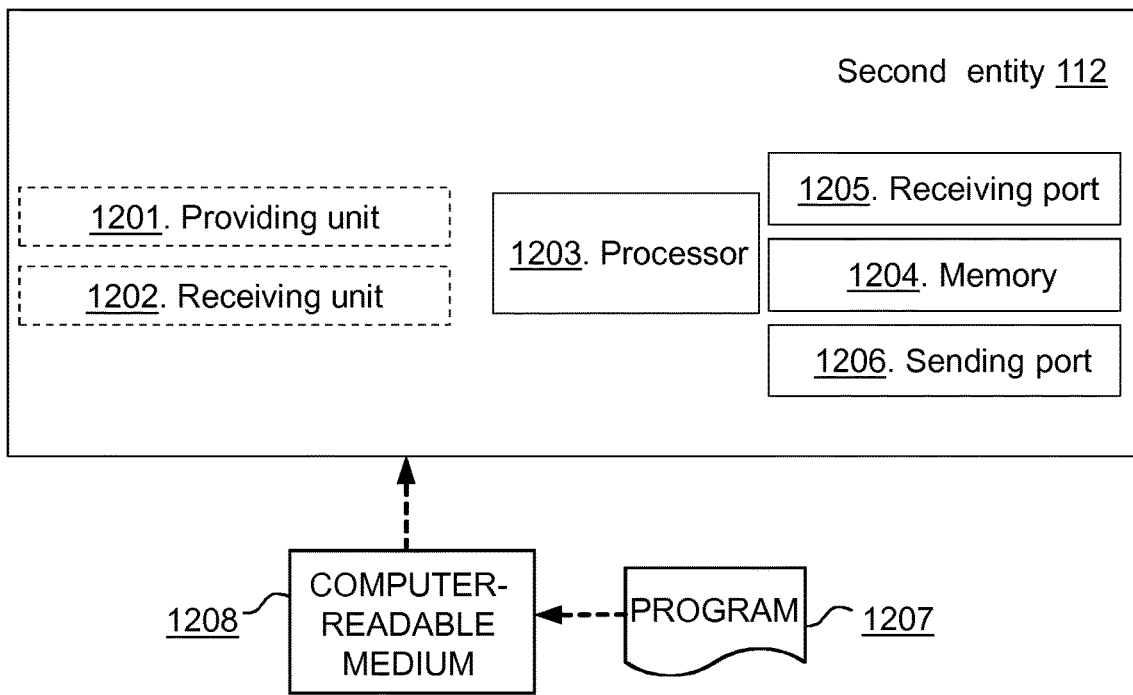
FIG. 12 is a schematic block diagram illustrating two non-limiting examples, a) and b), of a second entity, according to embodiments herein.
Figure 12:
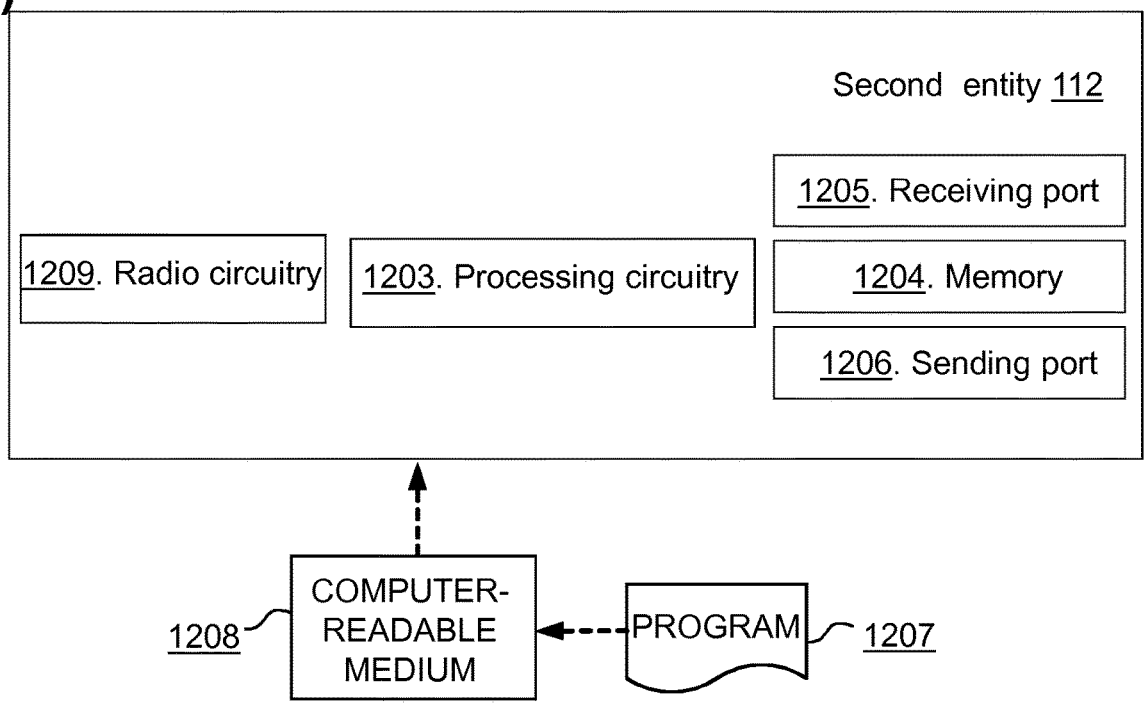

FIG. 12 depicts two different examples in panels a) and b), respectively, of the arrangement that the second entity 112 may comprise to perform the method actions described above in relation to FIG. 8. In some embodiments, the second entity 112 may comprise the following arrangement depicted in FIG. 12a. The second entity 112 may be considered to be for providing the service in the communications network 100. The second entity 112 is configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 12, optional boxes are indicated by dashed lines. The detailed description of some of the following corresponds to the same references provided above, in relation to the actions described for the first entity 111, and will thus not be repeated here. For example, the first entity 111 may be configured to manage a Software Define Network controller, and the second entity 112 may be configured to manage a Network Slice Management Function.

The second entity 112 is configured to, e.g. by means of a providing unit 1201 within the second entity 112 configured to, provide, to the first entity 111 configured to operate in the communications network 100, the request for the one or more links 118 to be allocated to the first network slice to provide the service in the communications network 100. The one or more links 118 may be configured to connect the one or more nodes 115 in the communications network 100 via the one or more paths 117. The request may be configured to indicate at least one of: a) the one or more requirements to be met by the one or more links 118, and b) the first priority to be assigned to the first network slice.

The second entity 112 is also configured to, e.g. by means of a receiving unit 1202 within the second entity 112 configured to, receive, from the first entity 111, the response to the request configured to be provided.

In some embodiments, the request may be further configured to indicate the level of acceptance of the degradation of at least one of: the first network slice and any of the one or more existing second network slices. The received response may be further configured to be based on the level of acceptance configured to be indicated.

The one or more requirements may be configured to be based on at least one of: the latency value of the one or more paths 117, jitter, throughput, bandwidth, energy consumption and latency.

In some embodiments, the response may be configured to comprise one of: a) the rejection of the request, wherein the set of available resources in the communications network 100 is insufficient to meet the one or more requirements, b) the acceptance of the request with the one or more requirements being met in part, and c) the acceptance of the request with the one or more requirements being fully met.

In some embodiments, the one or more links 118 may be configured to comprise at least one of: a radio link and a Wide Area Network link.

The embodiments herein may be implemented through one or more processors, such as a processor 1203 in the second entity 112 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the second entity 112. One such carrier may be in the form of a CD ROM disc. It is however feasible with other data carriers such as a memory stick. The computer program code may furthermore be provided as pure program code on a server and downloaded to the second entity 112.

The second entity 112 may further comprise a memory 1204 comprising one or more memory units. The memory 1204 is arranged to be used to store obtained information, store data, configurations, schedulings, and applications etc. to perform the methods herein when being executed in the second entity 112.

In some embodiments, the second entity 112 may receive information from, e.g., the first entity 111, the third entity 113, the other second entities in the plurality of second entities, e.g., the other one or more respective second entities 112, the plurality of third entities, and/or the one or more nodes 115, through a receiving port 1205. In some examples, the receiving port 1205 may be, for example, connected to one or more antennas in the second entity 112. In other embodiments, the second entity 112 may receive information from another structure in the communications network 100 through the receiving port 1205. Since the receiving port 1205 may be in communication with the processor 1203, the receiving port 1205 may then send the received information to the processor 1203. The receiving port 1205 may also be configured to receive other information.

The processor 1203 in the second entity 112 may be further configured to transmit or send information to e.g., the first entity 111, the third entity 113, the other second entities in the plurality of second entities, e.g., the other one or more respective second entities 112, the plurality of third entities, the one or more nodes 115, and/or another structure in the communications network 100, through a sending port 1206, which may be in communication with the processor 1203, and the memory 1204.

Those skilled in the art will also appreciate that any of the units 1201-1202 described above may refer to a combination of analog and digital circuits, and/or one or more processors configured with software and/or firmware, e.g., stored in memory, that, when executed by the one or more processors such as the processor 1203, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 1201-1202 described above may be the processor 1203 of the second entity 112, or an application running on such processor.

Thus, the methods according to the embodiments described herein for the second entity 112 may be respectively implemented by means of a computer program 1207 product, comprising instructions, i.e., software code portions, which, when executed on at least one processor 1203, cause the at least one processor 1203 to carry out the actions described herein, as performed by the second entity 112. The computer program 1207 product may be stored on a computer-readable storage medium 1208. The computer-readable storage medium 1208, having stored thereon the computer program 1207, may comprise instructions which, when executed on at least one processor 1203, cause the at least one processor 1203 to carry out the actions described herein, as performed by the second entity 112. In some embodiments, the computer-readable storage medium 1208 may be a non-transitory computer-readable storage medium, such as a CD ROM disc, a memory stick, or stored in the cloud space. In other embodiments, the computer program 1207 product may be stored on a carrier containing the computer program, wherein the carrier is one of an electronic signal, optical signal, radio signal, or the computer-readable storage medium 1208, as described above.

The second entity 112 may comprise an interface unit to facilitate communications between the second entity 112 and other nodes or devices, e.g., the first entity 111, the third entity 113, the other second entities in the plurality of second entities, e.g., the other one or more respective second entities 112, the plurality of third entities, the one or more nodes 115, and/or another structure in the communications network 100. In some particular examples, the interface may, for example, include a transceiver configured to transmit and receive radio signals over an air interface in accordance with a suitable standard.

In other embodiments, the second entity 112 may comprise the following arrangement depicted in FIG. 12b. The second entity 112 may comprise a processing circuitry 1203, e.g., one or more processors such as the processor 1203, in the second entity 112 and the memory 1204. The second entity 112 may also comprise a radio circuitry 1209, which may comprise e.g., the receiving port 1205 and the sending port 1206. The processing circuitry 1203 may be configured to, or operable to, perform the method actions according to FIG. 8, in a similar manner as that described in relation to FIG. 12a. The radio circuitry 1209 may be configured to set up and maintain at least a wireless connection with the first entity 111, the third entity 113, the other second entities in the plurality of second entities, e.g., the other one or more respective second entities 112, the plurality of third entities, the one or more nodes 115, and/or another structure in the communications network 100.

Hence, embodiments herein also relate to the second entity 112 operative to provide the service in the communications network 100, the second entity 112 being operative to operate in the communications network 100. The second entity 112 may comprise the processing circuitry 1203 and the memory 1204, said memory 1204 containing instructions executable by said processing circuitry 1203, whereby the second entity 112 is further operative to perform the actions described herein in relation to the second entity 112, e.g., in FIG. 8.

Figure 13:
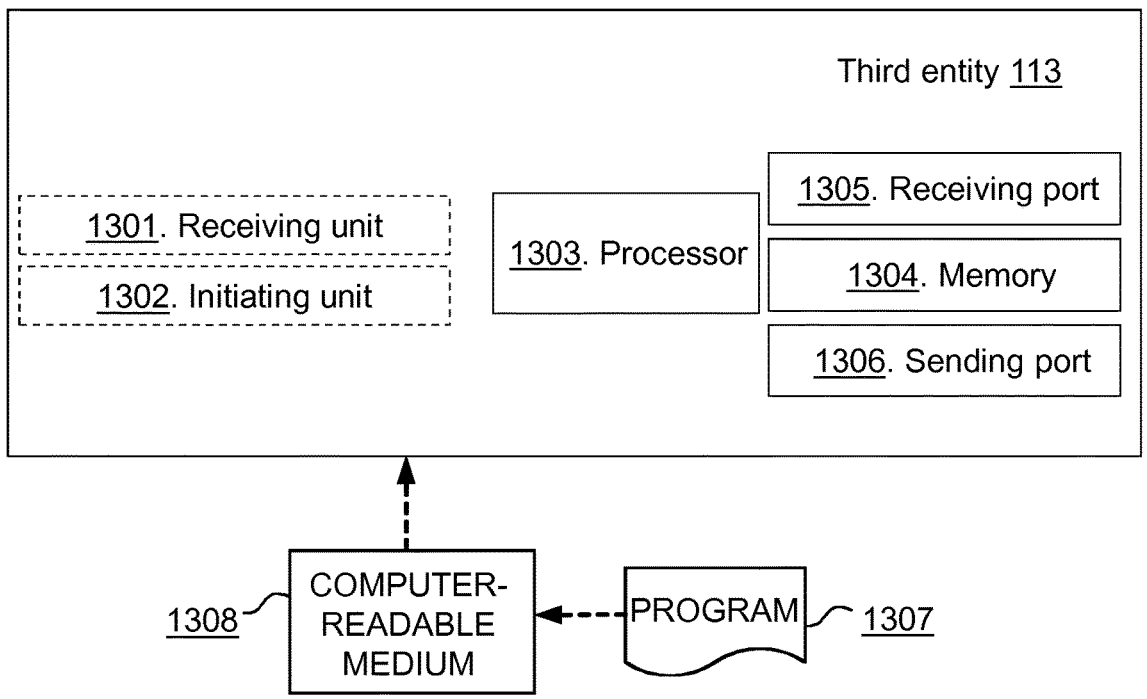
FIG. 13 is a schematic block diagram illustrating two non-limiting examples, a) and b), of a third entity, according to embodiments herein.
Figure 13:
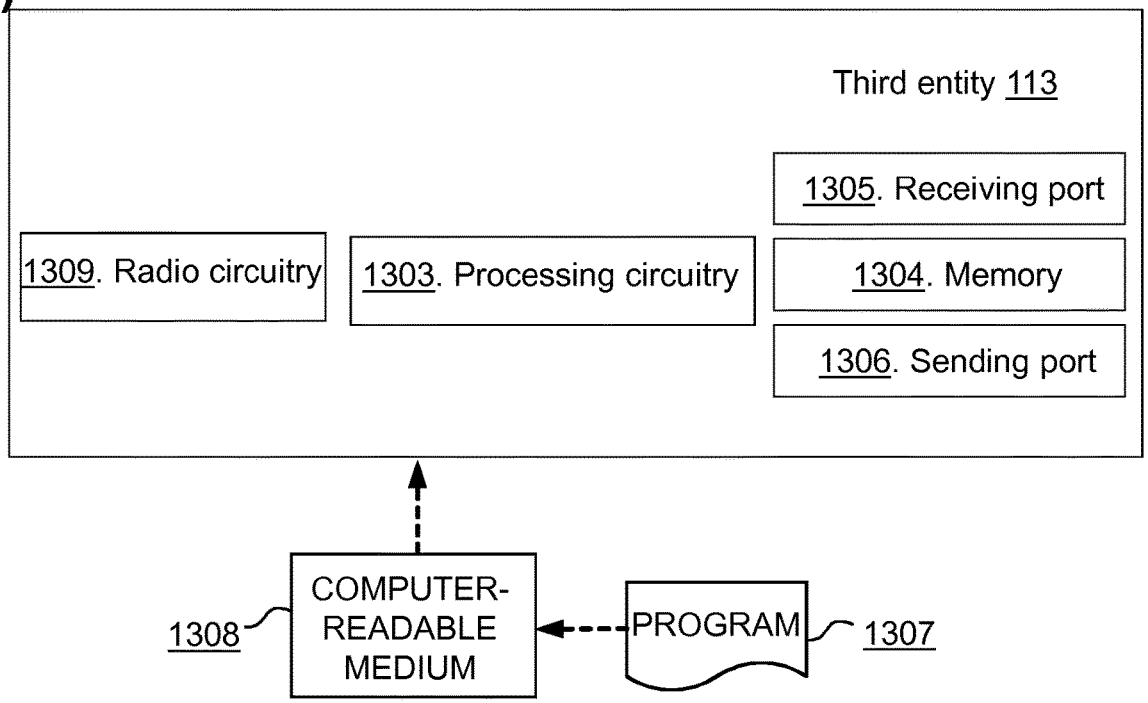

FIG. 13 depicts two different examples in panels a) and b), respectively, of the arrangement that the third node 113 may comprise to perform the method actions described above in relation to FIG. 9. In some embodiments, the third node 113 may comprise the following arrangement depicted in FIG. 13a. The third node 113 is configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 13, optional boxes are indicated by dashed lines. The detailed description of some of the following corresponds to the same references provided above, in relation to the actions described for the third node 113, and will thus not be repeated here. For example, the first entity 111 may be configured to manage a Software Define Network controller.

The third node 113 is configured to, e.g. by means of a receiving unit 1301 within the third node 113 configured to, receive, to the first entity 111 configured to operate in the communications network 100, the indication configured to indicate the warning about the status of the one or more second network slices. The warning is configured to indicate one of: a) the reduction from a full requirement satisfaction of the one or more second network slices, and b) the de-allocation of at least the one of the one or more second network slices. The one or more second network slices may be configured to have been assigned the one or more second allocations of resources. To receive may be configured to be based on the respective second priority configured to be assigned to the one or more second allocations.

The third node 113 is also configured to, e.g. by means of an initiating unit 1302 within the third node 113 configured to, initiate performing the operation and maintenance action in the communications network 100 to cease the warning configured to be indicated, based on the indication configured to be received.

The embodiments herein may be implemented through one or more processors, such as a processor 1303 in the third node 113 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the third node 113. One such carrier may be in the form of a CD ROM disc. It is however feasible with other data carriers such as a memory stick. The computer program code may furthermore be provided as pure program code on a server and downloaded to the third node 113.

The third node 113 may further comprise a memory 1304 comprising one or more memory units. The memory 1304 is arranged to be used to store obtained information, store data, configurations, schedulings, and applications etc. to perform the methods herein when being executed in the third node 113.

In some embodiments, the third node 113 may receive information from, e.g., the first entity 111, the second entity 112, the plurality of second entities, e.g., the one or more respective second entities 112, the other third entities of the plurality of third entities, and/or the one or more nodes 115, through a receiving port 1305. In some examples, the receiving port 1305 may be, for example, connected to one or more antennas in the third node 113. In other embodiments, the third node 113 may receive information from another structure in the communications network 100 through the receiving port 1305. Since the receiving port 1305 may be in communication with the processor 1303, the receiving port 1305 may then send the received information to the processor 1303. The receiving port 1305 may also be configured to receive other information.

The processor 1303 in the third node 113 may be further configured to transmit or send information to e.g., the second entity 112, the plurality of second entities, e.g., the first entity 111, the one or more respective second entities 112, the other third entities of the plurality of third entities, the one or more nodes 115 and/or another structure in the communications network 100, through a sending port 1306, which may be in communication with the processor 1303, and the memory 1304.

Those skilled in the art will also appreciate that the any of the units 1301-1302 described above may refer to a combination of analog and digital circuits, and/or one or more processors configured with software and/or firmware, e.g., stored in memory, that, when executed by the one or more processors such as the processor 1303, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the d units 1301-1302 described above may be the processor 1303 of the third node 113, or an application running on such processor.

Thus, the methods according to the embodiments described herein for the third node 113 may be respectively implemented by means of a computer program 1307 product, comprising instructions, i.e., software code portions, which, when executed on at least one processor 1303, cause the at least one processor 1303 to carry out the actions described herein, as performed by the third node 113. The computer program 1307 product may be stored on a computer-readable storage medium 1308. The computer-readable storage medium 1308, having stored thereon the computer program 1307, may comprise instructions which, when executed on at least one processor 1303, cause the at least one processor 1303 to carry out the actions described herein, as performed by the third node 113. In some embodiments, the computer-readable storage medium 1308 may be a non-transitory computer-readable storage medium, such as a CD ROM disc, a memory stick, or stored in the cloud space. In other embodiments, the computer program 1307 product may be stored on a carrier containing the computer program, wherein the carrier is one of an electronic signal, optical signal, radio signal, or the computer-readable storage medium 1308, as described above.

The third node 113 may comprise an interface unit to facilitate communications between the third node 113 and other nodes or devices, e.g., the first entity 111, the one or more respective second entities 112, the other third entities of the plurality of third entities, the one or more nodes 115 and/or another structure in the communications network 100. In some particular examples, the interface may, for example, include a transceiver configured to transmit and receive radio signals over an air interface in accordance with a suitable standard.

In other embodiments, the third node 113 may comprise the following arrangement depicted in FIG. 13b. The third node 113 may comprise a processing circuitry 1303, e.g., one or more processors such as the processor 1303, in the third node 113 and the memory 1304. The third node 113 may also comprise a radio circuitry 1309, which may comprise e.g., the receiving port 1305 and the sending port 1306. The processing circuitry 1303 may be configured to, or operable to, perform the method actions according to FIG. 9, in a similar manner as that described in relation to FIG. 13a. The radio circuitry 1309 may be configured to set up and maintain at least a wireless connection with the first entity 111, the one or more respective second entities 112, the other third entities of the plurality of third entities, the one or more nodes 115 and/or another structure in the communications network 100.

Hence, embodiments herein also relate to the third node 113 operative to operate in the communications network 100. The third node 113 may comprise the processing circuitry 1303 and the memory 1304, said memory 1304 containing instructions executable by said processing circuitry 1303, whereby the third node 113 is further operative to perform the actions described herein in relation to the third node 113, e.g., in FIG. 9.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method for providing a service in a communications network, the method being performed by a first entity operating in the communications network, the method comprising the following operations:
   obtaining, from a second entity operating in the communications network, a request for one or more links to be allocated to a first network slice to provide a service in the communications network via one or more paths, wherein:
      the one or more links connect one or more nodes in the communications network, and
      the request indicates one or more requirements to be met by the one or more links, a first priority to be assigned to the first network slice, and a level of acceptance of a degradation of at least one of the following: the first network slice, and one or more existing second network slices of the communications network;
   determining that a set of available resources in the communication network are insufficient to meet the one or more requirements according to the first priority and the level of acceptance of a degradation;
   determining whether or not to free resources from one or more existing second allocations of resources assigned to the one or more existing second network slices in the communications network, based on the level of acceptance of a degradation and on whether or not the first priority is higher than respective one or more second priorities assigned to the one or more second allocations; and
   sending, to another entity operating in the communications network, an indication based on an outcome of determining whether or not to free resources.

2. The method according to claim 1, wherein:
   the method further comprises iterating the operations of obtaining a request, determining that a set of available resources in the communication network are insufficient, and determining whether or not to free resources, for each of one or more subsequent requests from respective one or more second entities during a time period; and
   the indication sent to the other entity is based on an outcome of the iterated operations.

3. The method according to claim 1, wherein the one or more requirements is based on values for at least one of the following for the one or more paths: latency, jitter, throughput, bandwidth, and energy consumption.

4. The method according to claim 1, wherein the indication is one of the following:
   a response to the obtained request, wherein the other entity is the second entity, and
   a warning about a status of the one or more second network slices, wherein the other entity is a third entity managed by an operator of the communications network.

5. The method according to claim 4, wherein the response comprises one of the following:
   a rejection of the request,
   an acceptance of the request with the one or more requirements being met in part, and
   an acceptance of the request with the one or more requirements being fully met.

6. The method according to claim 4, wherein the warning indicates one of the following:
- a reduction from a full requirement satisfaction of the one or more second network slices, and
- a de-allocation of at least one of the one or more second network slices.

7. The method according to claim 1, wherein:
- the one or more links comprise at least one of the following: a radio link and a Wide Area Network link;
- the first entity is configured to manage a Software Define Network controller; and
- the second entity is configured to manage a Network Slice Management Function.

8. A first entity configured to operate in and provide a service in a communications network, the first entity comprising processing circuitry configured to perform operations corresponding to the method of claim 1.

9. The first entity according to claim 8, wherein the processing circuitry is further configured to:
- iterate the operations of obtain a request, determine that a set of available resources in the communication network are insufficient, and determine whether or not to free resources, for each of one or more subsequent requests from respective one or more second entities within a time period; and
- send the indication to the other entity based on an outcome of the iterated operations.

10. The first entity according to claim 8, wherein the indication is one of the following:
- a response to the obtained request, wherein the other entity is the second entity, or
- a warning about a status of the one or more second network slices, wherein the other entity is managed by an operator of the communications network.

11. The first entity according to claim 10, wherein the response is configured to comprise one of the following:
- a rejection of the request,
- an acceptance of the request with the one or more requirements being met in part, and
- an acceptance of the request with the one or more requirements being fully met.

12. The first entity according to claim 10, wherein the warning is configured to indicate one of the following:
- a reduction from a full requirement satisfaction of the one or more second network slices, or
- a de-allocation of at least one of the one or more second network slices.

13. The first entity according to claim 8, wherein:
- the one or more links comprise at least one of the following: a radio link and a Wide Area Network link;
- the first entity is configured to manage a Software Define Network controller; and
- the second entity is configured to manage a Network Slice Management Function.

14. A method for providing a service in a communications network, the method being performed by a second entity operating in the communications network, the method comprising:
- providing, to a first entity operating in the communications network, a request for one or more links to be allocated to a first network slice to provide a service in the communications network, wherein:
  - the one or more links connecting one or more nodes in the communications network via one or more paths, and
  - the request indicates one or more requirements to be met by the one or more links, a first priority to be assigned to the first network slice, and a level of acceptance of a degradation of at least one of the following: the first network slice, and one or more existing second network slices of the communications network; and
- receiving, from the first entity, a response to the request, wherein the response is based on the following:
  - the first priority,
  - respective one or more second priorities assigned to one or more second allocations of resources assigned to one or more existing second network slices in the communications network,
  - the level of acceptance of a degradation, and
  - a set of available resources in the communications network that are insufficient to meet the one or more requirements.

15. The method according to claim 14, wherein the one or more requirements are based on at least one of the following: a latency value of the one or more paths, jitter, throughput, bandwidth, energy consumption, and latency.

16. The method according to claim 14, wherein the response comprises one of the following:
- a rejection of the request,
- an acceptance of the request with the one or more requirements being met in part, or
- an acceptance of the request with the one or more requirements being fully met.

17. The method according to claim 14, wherein:
- the one or more links comprise at least one of the following: a radio link and a Wide Area Network link;
- the first entity is configured to manage a Software Define Network controller; and
- the second entity is configured to manage a Network Slice Management Function.

18. A second entity configured to operate in and provide a service in a communications network, the second entity comprising processing circuitry configured to perform operations corresponding to the method of claim 14.

19. The second entity according to claim 18, wherein the response is configured to comprise one of the following:
- a rejection of the request,
- an acceptance of the request with the one or more requirements being met in part, and
- an acceptance of the request with the one or more requirements being fully met.

20. The second entity according to claim 18, wherein:
- the one or more links comprise at least one of the following: a radio link and a Wide Area Network link;
- the first entity is configured to manage a Software Define Network controller; and
- the second entity is configured to manage a Network Slice Management Function.

21. A method performed by a third entity operating in a communications network, the method comprising:
- receiving, from a first entity operating in the communications network, an indication of a warning about a status of one or more second network slices of the communication network, wherein:
  - the warning indicates one of the following:
    - a reduction from a full requirement satisfaction of the one or more second network slices, or
    - a de-allocation of at least one of the one or more second network slices;
  - the one or more second network slices are assigned one or more second allocations of resources; and the warning is based on the following:
respective second priorities assigned to the one or more second allocations,
a first priority to be assigned to a first network slice by the first entity,
a set of available resources in the communications network being insufficient to meet one or more requirements of a second entity operating in the communication network, and
a level of acceptance, by the second entity, of a degradation of at least one of the following: the first network slice, and the one or more second network slices; and based on the received indication, initiating an operation and maintenance action in the communications network to cease the indicated warning.

22. A third entity configured to operate in a communications network, the third entity comprising processing circuitry configured to perform operations corresponding to the method of claim 21.

* * * * *